United States Patent [19]

Harrington et al.

[11] Patent Number: 5,635,573
[45] Date of Patent: Jun. 3, 1997

[54] METHOD FOR PREPARING ALPHA-OLEFIN/CYCLOOLEFIN COPOLYMERS

[75] Inventors: Bruce A. Harrington; Gregory G. Hlatkey; Jo Ann M. Canich, all of Houston; Natalie A. Merrill, Webster, all of Tex.

[73] Assignee: Exxon Chemical Patents Inc., Wilmington, Del.

[21] Appl. No.: 412,507

[22] Filed: Mar. 29, 1995

Related U.S. Application Data

[63] Continuation of Ser. No. 353,740, Dec. 12, 1994, abandoned, which is a continuation of Ser. No. 175,983, Dec. 30, 1993, abandoned, which is a continuation-in-part of Ser. No. 984,021, Dec. 1, 1992, abandoned.

[51] Int. Cl.$^6$ .............. C08F 4/643; C08F 232/04
[52] U.S. Cl. .............. 526/170; 526/113; 526/126; 526/127; 526/133; 526/134; 526/153; 526/160; 526/281; 526/308; 526/912
[58] Field of Search .................. 526/160, 170, 526/281, 308, 126, 127, 133, 134, 153, 161, 113

[56] References Cited

U.S. PATENT DOCUMENTS

| | | |
|---|---|---|
| 3,876,595 | 4/1975 | Ogura et al. . |
| 4,990,559 | 2/1991 | Shiraki et al. . |
| 5,055,438 | 10/1991 | Canich . |
| 5,087,677 | 2/1992 | Brekner et al. . |
| 5,153,157 | 10/1992 | Hlatky et al. .......... 526/132 X |
| 5,168,111 | 12/1992 | Canich . |
| 5,225,503 | 7/1993 | Sagane et al. .......... 526/281 X |
| 5,241,025 | 8/1993 | Hlatky et al. . |
| 5,272,235 | 12/1993 | Wakatsuru et al. .......... 526/281 |
| 5,324,801 | 6/1994 | Brekner et al. .......... 526/160 |
| 5,380,810 | 1/1995 | Lai et al. .......... 526/160 X |

FOREIGN PATENT DOCUMENTS

| | | |
|---|---|---|
| 283 164 | 9/1988 | European Pat. Off. . |
| 0283164 | 9/1988 | European Pat. Off. . |
| 395 075 | 10/1990 | European Pat. Off. . |
| 496 193 | 7/1992 | European Pat. Off. . |
| 504 418 | 9/1992 | European Pat. Off. . |
| 0504418 | 9/1992 | European Pat. Off. . |
| 503 422 | 9/1992 | European Pat. Off. . |
| 501 370 | 9/1992 | European Pat. Off. . |
| 62-215611 | 9/1987 | Japan . |
| WO 91/09882 | 7/1991 | WIPO . |
| WO 91/14713 | 10/1991 | WIPO . |
| WO 92/00333 | 1/1992 | WIPO . |
| 92/06123 | 4/1992 | WIPO . |

OTHER PUBLICATIONS

Plastics Industry News, Nov. 1991, pp. 165–166.
Makrolmol. Chem. 190, 515–526 (1989).
Kaminsky, et al., "Copolymers of Cycloalkenes with Ethylene in Presence of Chiral Zirconocene Catalysts", *Makromol. Chem.* 190, 515–526 (1989).

*Primary Examiner*—Fred Teskin
*Attorney, Agent, or Firm*—C. L. Bell; W. G. Muller

[57] ABSTRACT

Cycloolefin/alpha-olefin copolymers in a molar ratio from 5/95 to 95/5, optionally including long linear alpha-olefin, branched alpha-olefins and/or polyenes as additional comonomers, are prepared using a cyclopentadienyl metallocene catalyst system based on a transition metal compound from Group 4 of the Periodic Table of Elements. The copolymers have a high molecular weight, a narrow molecular weight distribution and a substantially uniform, random comonomer distribution.

16 Claims, No Drawings

1

METHOD FOR PREPARING ALPHA-OLEFIN/CYCLOOLEFIN COPOLYMERS

This application is a continuation of U.S. Ser. No. 08/353,740 filed Dec. 12, 1994, now abandoned, which is a continuation of U.S. Ser. No. 08/175,983 filed Mar. 30, 1993, now abandoned, which is a continuation-in-part of U.S. Ser. No. 07/984,021 filed Dec. 1, 1992, now abandoned.

FIELD OF THE INVENTION

This invention relates to a process for copolymerizing alpha-olefins with a cyclic olefin comonomer utilizing transition metal compounds from Group 4 of the Periodic Table of Elements. This invention also relates to high molecular weight alpha-olefin/cycloolefin copolymers. More particularly, the invention addresses the problems in the art of obtaining alpha-olefin/cycloolefin copolymers which simultaneously have high cycloolefin content, high molecular weight, narrow molecular weight distribution, and relatively random cycloolefin incorporation, and the use of catalysts and polymerization systems which have a relatively high productivity and a low reactivity ratio to produce such copolymers.

BACKGROUND OF THE INVENTION

As is well known in the prior art, catalyst systems comprising a Group 4 transition metal cyclopentadienyl compound, hereinafter frequently referred to as a metallocene or metallocene catalyst component, and an alumoxane offer several distinct advantages when compared to the more conventional Ziegler-type catalyst systems. For example, the cyclopentadienyl-transition metal/alumoxane catalyst systems, particularly those wherein the cyclopentadienyl compound contains at least one halogen atom, have demonstrated extremely high activity in the polymerization of alpha-olefins, particularly ethylene. Moreover, these catalyst systems produce relatively high yields of polymer product having a relatively narrow molecular weight distribution.

For many applications it is of primary importance for a polyolefin to have a high weight average molecular weight while having a relatively narrow molecular weight distribution. A high weight average molecular weight, when accompanied by a narrow molecular weight distribution, generally provides a polymer with high strength properties. Traditional Ziegler-Natta catalyst systems—a transition metal compound cocatalyzed by an aluminum alkyl—are in general capable of producing polyolefins having a high molecular weight but a relatively broader molecular weight distribution.

International Publication No. WO 87/03887 described the use of a composition comprising a transition metal coordinated to at least one cyclopentadienyl and at least one heteroatom ligand as a metallocene type component for use in a metallocene/alumoxane catalyst system for alpha-olefin polymerization. The composition is broadly defined as a transition metal, preferably of Group 4 of the Periodic Table which is coordinated with at least one cyclopentadienyl ligand and one to three heteroatom ligands, the balance of the coordination requirement being satisfied with cyclopentadienyl or hydrocarbyl ligands. The metallocene/alumoxane catalyst system described is illustrated solely with reference to transition metal compounds which are bis(cyclopentadienyl) Group 4 transition metal compounds.

U.S. Pat. No. 5,087,677 discloses polymers of polycyclic olefins, optionally with alpha-olefin and/or monocyclic olefins, prepared with a stereorigid, chiral bridged bis(cyclopentadienyl) transition metal catalyst and alumoxane cocatalyst, which have a relatively high polydispersity value (MWD) between 2.9 and 6.0.

European Patent Application 283,164 discloses copolymers of $C_3$ to $C_{20}$ alpha-olefin and cycloolefin prepared with an alkylene bis(indenyl) zirconium compound and an alumoxane. However, no ethylene or propylene copolymers having both a weight average molecular weight above about 24,000 daltons and a molecular weight distribution less than 2 were reported.

European Patent Application 501,370 discloses polycyclic olefin homopolymers and copolymers with monocycloolefins and/or acyclic alpha-olefins, prepared with a stereorigid, chiral bridged transition metal catalyst and alumoxane cocatalyst, reported to have a molecular weight distribution $M_w/M_n$ less than 2. However, none of the examples show a copolymer having both $M_w/M_n$ less than 2 and an $M_w$ greater than 50,000.

Commonly assigned U.S. Ser. No. 07/133,480, filed Dec. 22, 1987, now abandoned by Turner and Hlatky, discloses olefin polymerization with a bis(cyclopentadienyl) metal compound and a bulky, labile Lewis-acid anion activator such as tetra(perfluorophenyl) borate in liquid olefins which may act as monomers or comonomers including cyclopentene. EPA 277,004, published Mar. 8, 1988, corresponds thereto and is hereby incorporated herein by reference. Similarly, copending application U.S. Ser. No. 07/770,449, filed Oct. 3, 1991, now U.S. Pat. No. 5,194,903 by Canich et al.; which is a continuation-in-part of U.S. Ser. No. 581,841, Sep. 13, 1990; which in turn is a continuation-in-part of U.S. Ser. No. 533,245, Jun. 4, 1990; which is in turn a continuation-in-part of U.S. Ser. No. 406,945, Sep. 13, 1989 now abandoned; discloses polymerizing ethylene in combination with other monomers such as norbornene using a monocyclopentadienyl metal compound and an alumoxane.

Kaminsky et al., *Makromol. Chem.*, volume 190, pp. 515–526 (1989), discloses polymerization of cyclopentene, cycloheptene and cyclooctene with ethylene using chiral catalyst ethylene(bisindenyl) zirconium dichloride/methylaluminoxane to form isotactic copolymers. The ethylene-cyclopentene copolymers are reported to have molecular weights below 24,000 and MWD between 3 and 4.5.

SUMMARY OF THE INVENTION

In accordance with the present invention, one or more cycloolefins are copolymerized with one or more other olefins, including alpha-olefins, alpha, omega-dienes, polyenes, longer alpha-olefins ($C_{10}$–$C_{100}$), branched alpha-olefins, or a combination thereof, in the presence of a catalyst system comprising an activated cyclopentadienyl transition metal compound. Quite surprisingly, it has been found that the olefin:cycloolefin reactivity ratio is apparently sufficient to obtain substantial cycloolefin incorporation when the catalyst system is employed, despite the relative bulk of the cycloolefin. As a result, the cycloolefin comonomer is unexpectedly incorporated into the polymer at a competitive rate with the olefin, and the composition distribution is substantially uniform and substantially random.

By "substantially uniform" we mean that the distribution of comonomer(s) is similar through out the length of any particular chain and among the total chain population. In other words the comonomer distributions are not tapered or blocky. Comonomer distribution within a copolymer chain is typically deduced from carbon 13 NMR. It is recognized that the inherent limitations of carbon 13 NMR prevent measuring the entire chain, however carbon $^{13}$ NMR allows you to look at specific short sequences and information about the entire chain can be deduced therefrom.

By "substantially random" we mean that for the most part the sequences of monomer and comonomer are arranged in a random fashion, and are statistically dependent upon the reactivity ratios (reactivity ratios define the probability of insertion in a growing polymer chain) of the choosen comonomers. However, it is understood that above 50 mole %, steric influences hinder incorporating cyclics next to cyclics, and the geometry of the catalyst becomes more important. Careful catalyst selection can facilitate incorporation of the bulky cyclic monomers. For example a bridged cyclopentadienyl compound has a more open active center, and hence is preferred for copolymerization with high levels of bulky comonomers. In addition, "substantially random" is herein also defined to include a subset of polymers having higher than statistically expected levels of short sequences of alternating monomer and comonomer, i.e. MCMCM, not MMMMM-CCCCC.

The present invention resides, in part, in the discovery that cycloolefin(s) can be polymerized with various other olefins using certain mono- and bis-cyclopentadienyl metallocene catalysts to obtain a high molecular weight copolymer with a high proportion of cycloolefin comonomer incorporation, a narrow molecular weight distribution and a relatively random and uniform comonomer distribution. The present invention also resides, in part, in the discovery that articles such as fibers, films, molded parts, and the like made from certain of the copolymers have very surprising properties, such as, for example, modulus, strain to break, rheological properties, storage and loss moduli, dissipative characteristics, and the like.

In one aspect, the present invention provides a method of preparing polyolefin copolymers by contacting one or more alpha-olefins and one or more cycloolefin comonomers with a catalyst under polymerization conditions. The reactivity ratio of olefin:cycloolefin is desirably less than about 300. In a preferred embodiment, the process of this invention is practiced with that class of ionic catalysts referred to, disclosed, and described in copending U.S. patent application Ser. Nos. 133,052 now abandoned; 133,480; and 542,236; and U.S. Pat. Nos. 5,055,438 and 5,096,867; all of which are hereby incorporated herein by reference.

The ionic catalysts used in this invention can be represented by one of the following general formulae (all references to groups being the new group notation of the Period Table of the Elements as described by *Chemical and Engineering News*, 63 (5), 27, 1985):

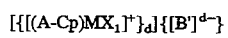    1.

    2.

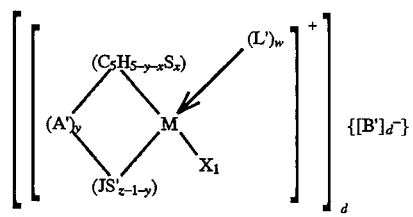    3.

wherein:

(A-Cp) is either (Cp)(Cp*) or Cp-A'-Cp*;

Cp and Cp* are the same or different cyclopentadienyl rings substituted with from zero to five substituent groups S, each substituent group S being, independently, a radical group which is a linear, branched, cyclic, or aromatic hydrocarbyl, substituted-hydrocarbyl, halocarbyl, substituted-halocarbyl, hydrocarbyl-substituted organometalloid, halocarbyl-substituted organometalloid, disubstituted boron, disubstituted pnictogen, substituted chalcogen or halogen radicals, or Cp and Cp* are cyclopentadienyl rings in which any two adjacent S groups are joined forming a $C_4$ to $C_{20}$ ring to give a saturated or unsaturated polycyclic cyclopentadienyl ligand;

A' is a bridging group, which group may serve to restrict rotation of the Cp and Cp* rings or $(C_5H_{5-y-x}S_x)$ and $JS'_{(z-1-y)}$ groups;

$(C_5H_{5-y-x}S_x)$ is a cyclopentadienyl ring substituted with from zero to five S radicals;

x is from 0 to 5 denoting the degree of substitution;

M is titanium, zirconium or hafnium;

$X_1$ is a hydride radical, hydrocarbyl radical, substituted-hydrocarbyl radical, hydrocarbyl-substituted organometalloid radical or halocarbyl-substituted organometalloid radical which radical may optionally be covalently bonded to both or either M and L or all or any M, S or S';

$(JS'_{z-1-y})$ is a heteroatom ligand in which J is an element from Group 15 of the Periodic Table of Elements with a coordination number of 3 or an element from Group 16 with a coordination number of 2;

S' is a radical group which is the same or different hydrocarbyl, substituted hydrocarbyl, halocarbyl, substituted halocarbyl, hydrocarbyl-substituted organometalloid, or halocarbyl-substituted organometalloid;

z is the coordination number of the element J;

y is 0 or 1;

L is an olefin, diolefin or aryne ligand, or a neutral Lewis base;

L' has the same meaning as L or can also be a second transition metal compound of the same type such that the two metal centers M and M* are bridged by $X_1$ and $X'_1$, wherein M* has the same meaning as M and $X'_1$ has the same meaning as $X_1$ where such dimeric compounds which are precursors to the cationic portion of the catalyst are represented by the formula:

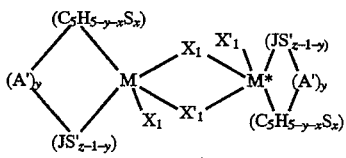    4.

w is an integer from 0 to 3;

B' is a chemically stable, non-nucleophilic anionic complex having a molecular diameter about or greater than 4 angstroms or an anionic Lewis-acid activator resulting from the reaction of a Lewis-acid activator with a precursor to the cationic portion of the catalyst described in formulae 1–4. When B' is a Lewis-acid activator, $X_1$ can also be an alkyl group donated by the Lewis-acid activator; and d is an integer representing the charge of B'.

In another aspect, the present invention provides an alpha-olefin/cycloolefin copolymer. The copolymer is substantially compositionally uniform and can include up to 90 mole percent of the cycloolefin, incorporated substantially randomly into the polymer. The copolymer preferably has a weight average molecular weight from about 30,000 to about 1,000,000 daltons or more, more preferably from about 70,000 to about 500,000 daltons, and a molecular weight distribution between about 1.2 and about 4. The copolymer preferably has a generally uniform composition distribution. The present invention also provides useful articles made from the foregoing copolymer, including fibers, films, sheets, coatings and molded articles. In particular, the invention provides copolymers having stiffness and a relatively high $T_g$, with correspondingly high distortion and use temperatures.

DETAILED DESCRIPTION OF THE INVENTION

The present invention relates to copolymers made by a process comprising polymerizing cycloolefin comonomer(s) with one or more olefins, e.g. alpha-olefins, alpha,omega-dienes, polyenes, longer alpha-olefins ($C_{10}$–$C_{100}$), branched alpha-olefins, or a mixture thereof, in the presence of a catalyst providing a low olefin:cycloolefin reactivity ratio, preferably less than about 300, more preferably less than about 100, and especially from about 25 to about 75. For the purposes of simplicity and clarity, the term "alpha-olefin" is used herein as representative of the suitable olefins which are polymerized with the cycloolefin(s).

The Cycloolefins

In general, any cycloolefin can be copolymerized with an olefin in the present process. The cycloolefin includes cyclized ethylenic or acetylenic unsaturation which polymerizes in the presence of the metallocene catalyst substantially by insertion polymerization, generally without ring opening, so that the ring structure in which the unsaturation is present is incorporated into the polymer backbone. Suitable cycloolefins generally correspond to one of the formulae:

Specific representative cycloolefins according to formula 5 are cyclobutene, cyclopentene, 3-methylcyclopentene, 4-methylcyclopentene, 3,4-dimethylcyclopentene, 3,5-dimethylcyclopentene, 3-chlorocyclopentene, cyclohexene, 3-methylcyclohexene, 4-methylcyclohexane, 3,4-dimethylcyclohexene, 3-chlorocyclohexene, cycloheptene, cyclododecene and the like. Preferred monocycloolefins according to formula 5 have from 4 to 12 carbon atoms, more preferably 6 to 8 carbon atoms.

Cycloolefins according to formulae 6 and 7 can be prepared by condensing cyclopentadienes with the corresponding olefins and/or cycloolefins in a Diels-Alder reaction. Specific representative cycloolefins according to formula 6 are as follows:

bicyclo(2.2.2)hept-2-ene;
6-methylbicyclo(2.2.1)hept-2-ene;
5,6-dimethylbicyclo(2.2.1)hept-2-ene;
1-methylbicyclo(2.2.1)hept-2-ene;
6-ethylbicyclo(2.2.1)hept-2-ene;
6-n-butylbicyclo(2.2.1)hept-2-ene;
6-isobutylbicyclo(2.2.1)hept-2-ene;
7-methylbicyclo(2.2.1)hept-2-ene;
5-phenylbicyclo(2.2.1)hept-2-ene;
5-methyl-5-phenylbicyclo(2.2.1)hept-2-ene;
5-benzylbicyclo(2.2.1)hept-2-ene;
5-tolylbicyclo(2.2.1)hept-2-ene;
5-ethylphenylbicyclo(2.2.1)hept-2-ene;
5-isopropylphenylbicyclo(2.2.1)hept-2-ene;
5-alpha-naphthylbicyclo(2.2.1)hept-2-ene;
5-acetoracenylbicyclo(2.2.1)hept-2-ene;
tetracyclo(4.4.0.1$^{2,5}$.1$^{7,10}$)-3-dodecene;
2-methyltetracyclo(4.4.0.1$^{2,5}$.1$^{7,10}$)-3-dodecene;
2-ethyltetracyclo(4.4.0.1$^{2,5}$.1$^{7,10}$)-3-dodecene;
2-propyltetracyclo(4.4.0.1$^{2,5}$.1$^{7,10}$)-3-dodecene;
2-hexyltetracyclo(4.4.0.1$^{2,5}$.1$^{7,10}$)-3-dodecene;
2-stearyltetracyclo(4.4.0.1$^{2,5}$.1$^{7,10}$)-3-dodecene;
2,3-dimethyltetracyclo(4.4.0.1$^{2,5}$.1$^{7,10}$)-3-dodecene;

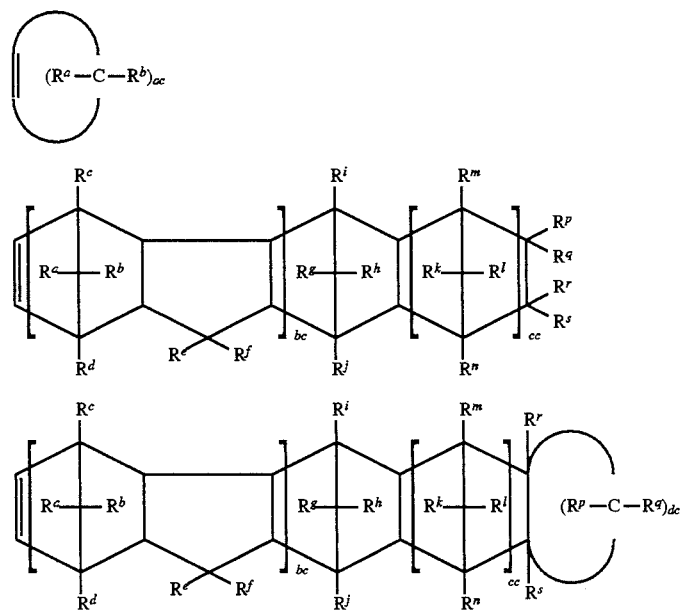

wherein each $R^a$ through $R^s$ is independently hydrogen, halogen, hydrocarbyl, or halohydrocarbyl; ac and dc are integers of 2 or more, and bc and cc are integers of 0 or more.

2-methyl-3-ethyltetracyclo(4.4.0.1$^{2,5}$.1$^{7,10}$)-3-dodecene;
2-chlorotetracyclo(4.4.0.1$^{2,5}$.1$^{7,10}$)-3-dodecene;
2-bromotetracyclo(4.4.0.1$^{2,5}$.1$^{7,10}$)-3-dodecene;
2,3-dichlorotetracyclo(4.4.0.1$^{2,5}$.1$^{7,10}$)-3-dodecene;
2-cyclohexyltetracyclo(4.4.0.1$^{2,5}$.1$^{7,10}$)-3-dodecene;

2-n-butyltetracyclo(4.4.0.1$^{2,5}$.1$^{7,10}$)-3-dodecene;
2-isobutyltetracyclo(4.4.0.1$^{2,5}$.1$^{7,10}$)-3-dodecene;
5,10-dimethyltetracyclo(4.4.0.1$^{2,5}$.1$^{7,10}$)-3-dodecene;
2,10-dimethyltetracyclo(4.4.0.1$^{2,5}$.1$^{7,10}$)-3-dodecene;
11,12-dimethyltetracyclo(4.4.0.1$^{2,5}$.1$^{7,10}$)-3-dodecene;
2,7,9-trimethyltetracyclo(4.4.0.1$^{2,5}$.1$^{7,10}$)-3-dodecene;
9-ethyl-2,7-dimethyltetracyclo(4.4.0.1$^{2,5}$.1$^{7,10}$)-3-dodecene;
9-isobutyl-2,7-dimethyltetracyclo(4.4.0.1$^{2,5}$.1$^{7,10}$)-3-dodecene;
9,11,12-trimethyltetracyclo(4.4.0.1$^{2,5}$.1$^{7,10}$)-3-dodecene;
9-ethyl-11,12-dimethyltetracyclo(4.4.0.1$^{2,5}$.1$^{7,10}$)-3-dodecene;
9-isobutyl-11,12-dimethyltetracyclo (4.4.0.1$^{2,5}$.1$^{7,10}$)-3-dodecene;
5,8,9,10-tetramethyltetracyclo(4.4.0.1$^{2,5}$.1$^{7,10}$)-3-dodecene;
8-methyltetracyclo(4.4.0.1$^{2,5}$.1$^{7,10}$)-3-dodecene;
8-ethyltetracyclo(4.4.0.1$^{2,5}$.1$^{7,10}$)-3-dodecene;
8-propyltetracyclo(4.4.0.1$^{2,5}$.1$^{7,10}$)-3-dodecene;
8-hexyltetracyclo(4.4.0.1$^{2,5}$.1$^{7,10}$)-3-dodecene;
8-stearyltetracyclo(4.4.0.1$^{2,5}$.1$^{7,10}$)-3-dodecene;
8,9-dimethyltetracyclo(4.4.0.1$^{2,5}$.1$^{7,10}$)-3-dodecene;
8-methyl-9-ethyltetracyclo(4.4.0.1$^{2,5}$.1$^{7,10}$)-3-dodecene;
8-chlorotetracyclo(4.4.0.1$^{2,5}$.1$^{7,10}$)-3-dodecene;
8-bromotetracyclo(4.4.0.1$^{2,5}$.1$^{7,10}$)-3-dodecene;
8-fluorotetracyclo(4.4.0.1$^{2,5}$.1$^{7,10}$)-3-dodecene;
8,9-dichlorotetracyclo(4.4.0.1$^{2,5}$.1$^{7,10}$)-3-dodecene;
8-cyclohexyltetracyclo(4.4.0.1$^{2,5}$.1$^{7,10}$)-3-dodecene;
8-isobutyltetracyclo(4.4.0.1$^{2,5}$.1$^{7,10}$)-3-dodecene;
8-butyltetracyclo(4.4.0.1$^{2,5}$.1$^{7,10}$)-3-dodecene;
8-ethylidenetetracyclo(4.4.0.1$^{2,5}$.1$^{7,10}$)-3-dodecene;
8-ethylidene-9-methyltetracyclo(4.4.0.1$^{2,5}$.1$^{7,10}$)-3-dodecene;
8-ethylidene-9-ethyltetracyclo(4.4.0.1$^{2,5}$.1$^{7,10}$)-3-dodecene;
8-ethylidene-9-isopropyltetracyclo(4.4.0.1$^{2,5}$.1$^{7,10}$)-3-dodecene;
8-ethylidene-9-butyltetracyclo(4.4.0.1$^{2,5}$.1$^{7,10}$)-3-dodecene;
8-n-propylidenetetracyclo(4.4.0.1$^{2,5}$.1$^{7,10}$)-3-dodecene;
8-n-propylidene-9-methyltetracyclo (4.4.0.1$^{2,5}$.1$^{7,10}$)-3-dodecene;
8-n-propylidene-9-ethyltetracyclo(4.4.0.1$^{2,5}$.1$^{7,10}$)-3-dodecene;
8-n-propylidene-9-isopropyltetracyclo (4.4.0.1$^{2,5}$.1$^{7,10}$)-3-dodecene;
8-n-propylidene-9-butyltetracyclo(4.4.0.1$^{2,5}$.1$^{7,10}$)-3-dodecene;
8-isopropylidenetetracyclo(4.4.0.1$^{2,5}$.1$^{7,10}$)-3-dodecene;
8-isopropylidene-9-methyltetracyclo(4.4.0.1$^{2,5}$. 1$^{7,10}$)-3-dodecene;
8-isopropylidene-9-ethyltetracyclo(4.4.0.1$^{2,5}$. 1$^{7,10}$)-3-dodecene;
8-isopropylidene-9-isopropyltetracyclo(4.4.0.1$^{2,5}$. 1$^{17,10}$)-3-dodecene;
8-isopropylidene-9-butyltetracyclo(4.4.0.1$^{2,5}$. 1$^{17,10}$)-3-dodecene;
hexacyclo(6.6.1.1$^{3,6}$.1$^{10,13}$.0$^{2,7}$.0$^{9,14}$)-4-heptadecene;
12-methylhexacyclo(6.6.1.1$^{3,6}$.1$^{10,13}$.0$^{2,7}$.0$^{9,14}$)-4-heptadecene;
12-ethylhexacyclo(6.6.1.1$^{3,6}$.1$^{10,13}$.0$^{2,7}$.0$^{9,14}$)-4-heptadecene;
12-isobutylhexacyclo(6.6.1.1$^{3,6}$.1$^{10,13}$.0$^{2,7}$.0$^{9,14}$)-4-heptadecene;
1,6,10-trimethyl-12-isobutylhexacyclo (6.6.1.1$^{3,6}$.1$^{10,13}$.0$^{2,7}$.0$^{9,14}$)-4-heptadecene;
octacyclo(8.8.0.1$^{2,9}$.1$^{4,7}$.1$^{11,18}$.1$^{13,16}$.0$^{3,8}$. 0$^{12,17}$)-5-dococene;
15-methyloctacyclo(8.8.0.1$^{2,9}$.1$^{4,7}$.1$^{11,18}$.1$^{13,16}$. 0$^{3,8}$.0$^{12,17}$)-5-dococene; and
15-ethyloctacyclo(8.8.0.1$^{2,9}$.1$^{4,7}$.1$^{11,18}$.1$^{13,16}$. 0$^{3,8}$.0$^{12,17}$)-5-dococene.

Specific representative cycloolefins according to formula 7 are as follows:
tricyclo(4.3.0.1$^{2,5}$)-3-decene;
2-methyltricyclo(4.3.0.1$^{2,5}$)-3-decene;
5-methyltricyclo(4.3.0.1$^{2,5}$)-3-decene;
tricyclo(4.4.0.1$^{2,5}$)-3-undecene;
10-methyltricyclo(4.4.0.1$^{2,5}$)-3-undecene;
pentacyclo(6.5.1.1$^{3,6}$.0$^{2,7}$.0$^{9,13}$)-4-pentadecene;
pentacyclo(4.7.0.1$^{2,5}$.0$^{8,13}$.1$^{9,12}$)-3-pentadecene;
methyl-substituted pentacyclo(4.7.0.1$^{2,5}$.0$^{8,13}$. 1$^{9,12}$)-3-pentadecene;
1,3-dimethylpentacyclo(6.5.1.1$^{3,6}$.0$^{2,7}$.0$^{9,13}$)-4-pentadecene;
1,6-dimethylpentacyclo(6.5.1.1$^{3,6}$.0$^{2,7}$.0$^{9,13}$)-4-pentadecene;
14,15-dimethylpentacyclo(6.5.1.1$^{3,6}$.0$^{2,7}$.0$^{9,13}$)-4-pentadecene;
pentacyclo(6.6.1.1$^{3,6}$.0$^{2,7}$.0$^{9,14}$)-4-hexadecene;
1,3-dimethylpentacyclo(6.6.1.1$^{3,6}$.0$^{2,7}$.0$^{9,14}$)-4-hexadecene;
1,6-dimethylpentacyclo(6.6.1.1$^{3,6}$.0$^{2,7}$.0$^{9,14}$)-4-hexadecene;
15,16-dimethylpentacyclo(6.6.1.1$^{3,6}$.0$^{2,7}$.0$^{9,14}$)-4-hexadecene;
heptacyclo(8.7.0.1$^{2,9}$.1$^{4,7}$.1$^{11,17}$.0$^{3,8}$.0$^{12,16}$)-5-eicosene;
heptacyclo(7.8.0.1$^{3,6}$.0$^{2,7}$.1$^{10,17}$.0$^{11,16}$.1$^{12,13}$)-4-eicosene;
heptacyclo(8.8.0.1$^{2,9}$.1$^{4,7}$.1$^{11,18}$.0$^{3,8}$.0$^{12,17}$)-5-heneicosene;
nonacyclo(9.10.1.1$^{4,7}$.0$^{3,8}$.0$^{2,18}$.0$^{12,21}$.1$^{13,20}$. 0$^{14,19}$.1$^{15,18}$)-5-pentacosene;
1,4-methano-1,1a,4,4a-tetrahydrofluorene;
1,4-methano-1,1a,4,4a,5,10a-hexahydroanthracene; and
cyclopentadiene-acenaphthylene adduct.

Suitable cycloolefins also include cyclic and polycyclic non-conjugated dienes and trienes having a cyclized carbon-carbon double bond which is polymerizable in an addition polymerization reaction. Particularly, such dienes and trienes can be used in relatively minor proportions, e.g. 0.1 to 3 mole percent, as a termonomer with a major proportion of a cyclic monoolefin. Specific representative examples of such cyclopolyenes include the following:
dicyclopentadiene;
tricylopentadiene;
4-methylcyclo-1,4-octadiene;
4-methyl-5-propylcyclo-1,4-octadiene;
5-methylcyclopentadiene;
4-methyl-5-ethyldicyclopentadiene;
5-isopropyldicyclopentadiene;
1,5,9-cyclododecatriene;
2-methyl-2,5-norbornadiene;
5-methyl-2,5-norbornadiene;
2-propyl-2,5-norbornadiene;
3-heptyl-2,5-norbornadiene;
2-ethyl-3-propyl-2,5-norbornadiene;
2-(1'5'-dimethylhexene-4-yl)-2,5-norbornadiene;
2-ethylbicyclo(2.2.2)-2,5-octadiene;
2-methyl-3-ethyl-bicyclo(2.2.2)-2,5-octadiene;
2-hexylbicyclo(2.2.2)-2,5-octadiene;
2-(1',5'-dimethylhexenyl-4)bicyclo(2.2.2)-2,5-octadiene;
1-isopropylidenebicyclo(4.4.0)-2,6-decadiene;
3-ethylenebicyclo(3.2.0)-2,6-heptadiene;
3-methylbicyclo(3.3.0)-2,6-octadiene;
pentacyclo(6.5.1.1$^{3,6}$.0$^{2,7}$.0$^{9,13}$)-4,10-pentadocadiene;
3-methyl-4,7,8,9-tetrahydroindene;
6-methyl-4,7,8,9-tetrahydroindene; and
2-propyl-4,7,8,9-tetrahydroindene.

When dicyclopentadiene (or a similar cyclopolyene) is employed, it is preferably used in the exo form.

When the cycloolefin is a cyclic diene or triene, the resulting copolymer can contain pendant cyclized double bonds which are potential sites for functionalization, derivitization, cross-linking, etc. The functional copolymer is especially preferred in application calling for compatibilizers, bonding resins, precursors for block and graft copolymers, viscosity modifiers and the like. In particular, these copolymers based on polypropylene as the alpha-olefin can be used as gamma-ray-resistant copolymers, for example, in medical applications where gamma-ray sterilization is used. The propylene-cyclic diene copolymers generally exhibit chain extension upon irradiation, rather than chain scission or crosslinking, leading to a polypropylene containing long chain branching which is relatively easy to process due to favorable shear-thinning behavior.

Especially preferred cycloolefins include cyclobutene, cyclopentene, deltacyclene, 2-norbornene, 3-methyl-2-norbornene, 5-methyl-2-norbornene, tetracyclododecene, methyltetracyclododecene, and dimethyltetracyclododecene.

The Olefins

The alpha-olefin(s) copolymerized with the cycloolefin(s) can be any unsaturated, copolymerizable monomer having at least 2 carbon atoms, or mixture or combination thereof. Typically, the alpha-olefin is a $C_2$–$C_{20}$ alpha-olefin, such as, for example, ethylene, propylene, 1-butene, 1-pentene, 3-methyl-pentene-1, 4-methylpentene-1, 1-hexene, 1-heptene, 1-octene, 1-nonene, 1-decene, 1-undecene, 1-dodecene, 1-tetradecene, 1-hexadecene, 1-octadecene, 1-eicosene, allyltrimethyl silane, and the like; or vinyl aromatic and alicyclic monomers, such as, for example, styrene, alkyl-substituted styrene, vinyl cyclohexene, and the like. The alpha-olefin can also be (or include) a longer alpha-olefin, a branched alpha-olefin or a polyene, or a combination thereof; either alone as the sole alpha-olefin comonomer(s), or more preferably as a termonomer in combination with a $C_2$–$C_{20}$ alpha-olefin, particularly a $C_2$–$C_8$ alpha-olefin, especially ethylene, propylene, or a mixture of ethylene and propylene.

As used herein, the terminology "alpha-olefin" is intended to refer generically to longer alpha-olefins, branched alpha-olefins and polyenes, as well as the more usual $C_2$–$C_{20}$ alpha-olefins. Also as used herein, the term "copolymer" is intended to refer in a broad sense to polymers containing two or more monomers, e.g., 2, 3, 4, 5 or more different monomers; and similarly the term "comonomer" is not restricted to a second monomer, but can also refer to third, fourth, fifth, or additional monomers.

The Longer Alpha-Olefins

The longer alpha-olefin comonomer(s) and/or termonomer(s) is preferably a linear monomer of at least 10 carbon atoms up to about 100 carbon atoms or more. Novel characteristics of the copolymer of this embodiment can derive from the relatively long pendant alkyl side chains that are introduced by the "tails" of the longer alpha-olefin comonomers as they are inserted into the generally linear polymer chain. Generally, at low incorporation rates, e.g., thought to be from about 0.1 to about 10 mole percent, the longer alpha-olefin substantially affects the bulk copolymer characteristics in much the same degree as the $C_2$–$C_8$ alpha-olefins, but improves processability by increasing melt strength. Particularly at side chain lengths of 10 or more carbon atoms (corresponding to $C_{12}$ alpha-olefin comonomer), the effect of the side chains is more definite and pronounced.

Theoretically, any alpha-olefin up to 1000 carbon atoms or more can be used, but as a practical matter, alpha-olefins of up to $C_{30}$ of the desired purity are available commercially. Alpha-olefins having more than about 30 carbon atoms generally have a broader distribution of molecular weights, and can also have some branching which influences crystallizability. Thus, the preferred alpha-olefins in this embodiment are linear alpha-olefins having from about 10 to about 100 carbon atoms, more preferably from about 12 to about 30 carbon atoms.

Specific representative examples of the longer alpha-olefins include 1-decene, 1-undecene, 1-dodecene, 1-tetradecene, 1-hexadecene, 1-octadecene, 1-eicosene, 1-docosene, 1-tetracosene, 1-hexacosene, 1-octacosene, 1-triacontene, 1-dotriacontene, 1-tetracontene, 1-pentacontene, 1-hexacontene, 1-heptacontene, 1-octacontene, 1-nonacontene, 1-hectene and the like. In general, the longer the alpha-olefin, the more pronounced are the properties imparted.

The longer alpha-olefin copolymer can further contain one or more comonomers in addition to the longer alpha-olefin, ethylene and/or propylene, usually in relatively minor amounts, which do not substantially adversely affect the properties of the copolymer. Such additional alpha-olefin comonomers include vinyl and vinylidene compounds, for example, lower alpha-olefins having from 4 to 9 carbon atoms, such as, 1-butene, 1-pentene, 4-methylpentene-1, 1-hexene, 1-heptene, 1-octene, 1-nonene, vinyl cyclohexene, and the like; vinyl aromatic monomers, such as styrene or alkyl-substituted styrene and the like; and combinations thereof. These additional comonomers can be used particularly when it is desired to break up the crystallinity of ethylene and/or propylene portions of the copolymer.

In one embodiment, the cycloolefin is interpolymerized with from about 0.1 to about 50 mole percent longer alpha-olefin, more preferably from about 2 to about 30 mole percent longer alpha-olefin, and especially from about 4 to about 30 mole percent longer alpha-olefin, with or without an optional $C_2$–$C_8$ alpha-olefin. One particular embodiment is a copolymer of cycloolefin and ethylene with from 0.1 to 10 mole percent longer alpha-olefin. In general, at an increased longer alpha-olefin content, the properties imparted by the longer alpha-olefin are more pronounced, e.g., density and strain to break decrease while softness and melt strength increase with increasing longer α-olefin content. However, when the longer alpha-olefin comonomer content is increased to a point where the side chains become prevalent, e.g. there is side chain crystallization as a separate domain, the hardness increases and strain to break increases significantly.

The polymers of this embodiment can vary from completely amorphous to highly crystalline. Crystallinity can be influenced by a number of factors, including molecular weight, the size of the cycloolefin and longer alpha-olefin and the contents thereof, the presence or absence of other comonomers, the composition distribution, and the stereoconfiguration of the copolymerization catalyst. In general, cycloolefin/alpha-olefin copolymers containing a total of about 12 mole percent or more of randomly distributed cycloolefin and/or longer alpha-olefin are amorphous, whereas copolymers containing a total of less than about 12 mole percent of the cycloolefin and/or longer alpha-olefin comonomers have more crystallinity as the cycloolefin and/or longer alpha-olefin contents are reduced. Where an amorphous cycloolefin/alpha-olefin copolymer is desired and the cycloolefin and longer alpha-olefin contents are low, ethylene can also be introduced as an additional comonomer, generally at 1 to about 50 mole percent, preferably at 10 to 20 mole percent. In this manner, an amorphous cycloolefin/ longer alpha-olefin copolymer can be obtained at low incorporation rates of the longer alpha-olefin and cycloolefin.

The Branched Alpha-Olefins

In another embodiment, the cycloolefin copolymer comprises one or more branched alpha-olefins, preferably as a comonomer with a $C_2$–$C_8$ alpha-olefin, particularly ethylene, propylene or a mixture thereof. The branched alpha-olefin is generally not copolymerizable at a competitive rate when conventional Ziegler-Natta catalysts are used. The branched alpha-olefin generally has at least one alkyl branch adjacent to the ethylenic unsaturation of the comonomer, and thus, when copolymerized forms a copolymer, having (1) a generally linear backbone or main chain corresponding to the alpha-olefin such as ethylene, propylene or a mixture of ethylene and propylene, (2) cyclized backbone groups randomly interspersed along the backbone comprising the cyclic groups of the cycloolefin monomer, and (3) pendant side chains randomly interspersed along the backbone with alkyl branches on the side chain adjacent the backbone. The alkyl branches on the side chains are preferably closer to the polymer backbone than the terminal carbon in the side chain, or stated another way, the alkyl branch on the alpha-olefin is preferably closer to the ethylenic unsaturation than the terminal carbon of the longest straight chain of the comonomer. The branched alpha-olefin contains at least one alkyl branch, and more preferably has from 2 to 4 alkyl branches along the longest straight chain. Preferred branches have from 1 to 3 carbon atoms each, such as methyl, ethyl, propyl and isopropyl. The branched alpha-olefin must have at least 5 carbon atoms, more preferably has at least 6 carbon atoms, and most preferably has at least 8 carbon atoms. The branched alpha-olefin is not, in general, restricted at any particular upper size limit and $C_{100}$ or larger could be used, although as a practical matter, the branched alpha-olefin preferably contains less than about 30 carbon atoms, more preferably up to about 14, and especially up to about 12 carbon atoms.

In accordance with a preferred embodiment, the branched alpha-olefin has the formula:

$$H_2C=CH-CHR^a R^b$$

wherein $R^a$ is $C_{1-3}$ alkyl and $R^b$ is aliphatic hydrocarbyl having two or more carbon atoms, and wherein the branched α-olefin has up to about 30 carbon atoms, preferably 6 to 14 carbon atoms and more preferably 8 to 12 carbon atoms.

Specific representative examples of contemplated branched alpha-olefins include:

3-methylpentene-1;
3-ethylpentene-1;
3,4-dimethylpentene-1;
4-methyl-3-ethylpentene-1;
3,4,4-trimethylpentene-1;
4,4-dimethyl-3-ethylpentene-1;
3-methylhexene-1;
3-ethylhexene-1;
3-propylhexene-1;
3-isopropylhexene-1;
3,4-dimethylhexene-1;3,5-dimethylhexene-1;
4-methyl-3-ethylhexene-1;
5-methyl-3-ethylhexene-1;
3-methyl-4-ethylhexene-1;
4-methyl-3-propylhexene-1;
5-methyl-3-propylhexene-1;
3,4-diethylhexene-1;
4-methyl-3-isopropylhexene-1;
5-methyl-3-isopropylhexene-1;
3,4-diethylhexene-1;
3,4,4-trimethylhexene-1;
3,4,5-trimethylhexene-1;
3,5,5-trimethylhexene-1;
4,4-dimethyl-3-ethylhexene-1;
4,5-dimethyl-3-ethylhexene-1;
5,5-dimethyl-3-ethylhexene-1;
3,4-dimethyl-4-ethylhexene-1;
3,5-dimethyl-4-ethylhexene-1;
4-methyl-3,4-diethylhexene-1;
5-methyl-3,4-diethylhexene-1;
3-methyl-4,4-diethylhexene-1;
3,4,4-triethylhexene-1;
4,4-dimethyl-3-propylhexene-1;
4,5-dimethyl-3-propylhexene-1;
5,5-dimethyl-3-propylhexene-1;
4,4-dimethyl-3-isopropylhexene-1;
4,5-dimethyl-3-isopropylhexene-1;
5,5-dimethyl-3-isopropylhexene-1;
3,4,4,5-tetramethylhexene-1;
3,4,5,5-tetramethylhexene-1;
4,4,5-trimethyl-3-ethylhexene-1;
4,5,5-trimethyl-3-ethylhexene-1;
3,4,5-trimethyl-4-ethylhexene-1;
3,5,5-trimethyl-4-ethylhexene-1;
4,5-dimethyl-3,4-diethylhexene-1;
5,5-dimethyl-3,4-diethylhexene-1;
3,5-dimethyl-4,4-diethylhexene-1;
5-methyl-3,4,4-triethylhexene-1;
5-ethylnonene-1 and the like.

The cycloolefin/branched alpha-olefin copolymer can further contain additional monomers, often in relatively minor amounts, which do not substantially adversely affect the novel properties of the copolymer. Such additional monomers include vinyl and vinylidene compounds, for example, generally linear alpha-olefins having from 2 to 100 carbon atoms, preferably from 2 to 10 carbon atoms, such as, ethylene, propylene, 1-butene, isobutene, 1-pentene, 4-methylpentene-1, 1-hexene, 1-heptene, 1-octene, 1-nonene, and the like; vinyl aromatic and alicyclic monomers, such as styrene, alkyl-substituted styrene, vinyl cyclohexane, vinyl cyclohexene and the like; and combinations thereof.

Specifically contemplated are copolymers of ethylene and/or propylene, the branched alpha-olefin, and the cycloolefin. Preferably, the ethylene and/or propylene is interpolymerized with from about 0.5 to about 10 mole percent of the branched alpha-olefin, more preferably from about 1 to about 8 mole percent branched alpha-olefin, and especially from about 1 to about 5 mole percent branched alpha-olefin; and with from about 5 to about 95 mole percent cycloolefin, more preferably from about 5 to about 40 mole percent cycloolefin. When ethylene and propylene are used together, they can be present in the copolymer at any suitable ethylene:propylene ratio, e.g. from about 10 mole percent to about 90 mole percent. In general, at an increased branched alpha-olefin content, the properties imparted by the branched alpha-olefin are more pronounced, e.g., toughness and strain hardening increase.

The side chains in the present copolymers are contemplated to have a profound effect on the crystalline behavior of the copolymers. For example, a copolymer containing a 3-methyl branched alpha-olefin such as 3,5,5-trimethylhexene-1 can exhibit very high toughness and profound strain hardening. As the position of the branch is moved away from the backbone, say to the 5-position as in, for example, 5-ethylnonene copolymers, the toughness can decrease and strain hardening can be much less pronounced than with the 3,5,5-trimethylhexene-1 copolymers.

The novel characteristics of the cycloolefin/branched alpha-olefin copolymers of the present invention, i.e. simultaneously high branched alpha-olefin content, high $M_w$, narrow MWD, stereoregularity (where the catalyst is a chiral metallocene) and a relatively good degree of random comonomer incorporation, are contemplated to impart a number of unique and, in some cases, rather surprising physical, rheological and other properties to the copolymers. As a consequence, the copolymers have a wide number of uses, particularly where high toughness is desirable.

The Polyenes

In another embodiment, a polyene, which is acyclic or is cyclic but has acyclic polymerizable unsaturation, can optionally be copolymerized with the cycloolefin and another alpha-olefin comonomer to produce a copolymer with from about 0.1 to about 10 mole percent polyene, preferably from about 1 to about 3 mole percent polyene. The polyene introduces residual olefinic unsaturation into the pendant side chains by which the copolymer can be crosslinked and/or chemically functionalized. The polyene must contain at least two carbon-carbon double bonds, e.g. as in dienes, one of which is polymerized in the main chain of the copolymer, and the other of which is generally unreacted to yield reactive side chain unsaturation, although three double bonds (i.e. trienes) or more can be present to yield additional side chain unsaturation or where the additional double bonds are generally inert.

In contrast, polyenes having a plurality of double bonds which are polymerized in the main chain will tend to promote crosslinking and gel formation, as discussed below, rather than the residual side chain unsaturation desired in this embodiment for post-polymerization functionalization. Also, conjugated polyenes which tend to introduce residual unsaturation into the main chain are generally not preferred in this embodiment because the resulting main chain unsaturation can adversely affect the stability, chemical and solvent resistance, and other properties of the copolymer. Preferably, the polyene is selected so that only one double bond participates in the polymerization reaction so as to obtain a generally linear copolymer substantially free of crosslinking (until the side chains are crosslinked, e.g. chemically or by irradiation). In general, dienes having a non-conjugated second carbon-carbon double bond which is sterically hindered, for example, by substitution with hydrocarbyl or by cyclization, are preferred.

Suitable optional polyenes of this embodiment generally include linear or branched aliphatic dienes and trienes, monocyclic dienes and trienes, bicyclic dienes and trienes, polycyclic dienes, aromatic dienes, and the like. Specific representative examples of non-conjugated polyenes include:
1,4-hexadiene; 6-methyl-1,4-heptadiene;
4-isopropyl-1,4-hexadiene; 4-methyl-1,4-hexadiene;
5-methyl-1,4-hexadiene; 4-ethyl-1,4-hexadiene;
4-isopropyl-1,4-hexadiene;
6-phenyl-4-propyl-1,4-hexadiene;
4,5-dimethyl-1,4-hexadiene; 6-phenyl-1,4-hexadiene;
5-methyl-1,5-octadiene; 6-methyl-1,5-octadiene;
6-methyl-1,5-heptadiene; 5,7-dimethyl-1,5-octadiene;
4,5-dipropyl-1,4-octadiene;
5-propyl-6-methyl-1,5-heptadiene;
5-ethyl-7-methyl-1,6-octadiene; 1,5-hexadiene;
1,6-heptadiene; 1,6-octadiene; 1,7-octadiene;
1,8-nonadiene; 1,8-decadiene; 1,9-decadiene;
1,10-undecadiene; dicyclopentadiene;
tricylopentadiene;
1-vinyl-4-(1-propenyl)-cyclohexane;
4-methylcyclo-1,4-octadiene;
4-methyl-5-propylcyclo-1,4-octadiene;
5-methylcyclopentadiene;
4-methyl-5-ethyldicyclopentadiene;
5-isopropyldicyclopentadiene;
1,5,9-cyclododecatriene; 4-(1-butenyl-2)-styrene;
4-(2-buten-2-yl)-styrene;
trans-1,2-divinylcyclobutane;
5-ethylidenenorbornene-2; 5-propylidenenorbornene-2;
5-butylidenenorbornene-2;
5-isopropylidene-norbornene-2;
2-methyl-2,5-norbornadiene;
5-methyl-2,5-norbornadiene;
2-propyl-2,5-norbornadiene;
5-methylene-2-norbornene;
5-(2-butenyl)-2-norbornene;
3-heptyl-2,5-norbornadiene;
2-ethyl-3-propyl-2,5-norbornadiene;
2-(1',5'-dimethylhexene-4-yl)-2,5-norbornadiene;
dicyclopentadiene; tricylopentadiene;
5-isopropyldicyclopentadiene;
5-isopropylidenebicyclo(2.2.2)octene-2;
5-ethylidenebicyclo(2.2.2)octene-2;
5-butylidenebicyclo(2.2.2)octene-2;
2-ethylbicyclo(2.2.2)octadiene-2,5;
2-methyl-3-ethylbicyclo(2.2.2)octadiene-2,5;
2-hexylbicyclo(2.2.2)octadiene-2,5;
2-(1',5'-dimethylhexenyl-4)bicyclo (2.2.2)octadiene-2,5;
1-isopropylidenebicyclo(4,4,0)decadiene-2,6;
2-isopropylidenebicyclo(4,4,0)decene-6;
2-ethylidenebicyclo(4,4,0)decene-6;
3-ethylidenebicyclo(3,2,0)heptadiene-2,6;
3-methylbicyclo(3,3,0)octadiene-2,6;
3-methyl-4,7,8,9-tetrahydroindene;
6-methyl-4,7,8,9-tetrahydroindene;
2-propyl-4,7,8,9-tetrahydroindene;
1-isopropylidene-4,7,8,9-tetrahydroindene;
1-(1'-phenyl)-ethylidene-4,7,8,9-tetrahydroindene;
and the like.

As mentioned above, as an alternative to residual side chain unsaturation, polyenes having two or more double bonds, each participating in the polymerization with the cycloolefin and any other alpha-olefin, can be used in a relatively minor proportion to impart higher molecular weight to the copolymer. Since such polyenes will polymerize at two (or more) sites, these monomers tend to promote some chain extension which can double or quadruple the molecular weight at low incorporation rates. Ideally the polyene is not present in such high amounts which might result in excessive crosslinking and produce insoluble gel formation. Preferably, the molecular weight is suitably increased by polyene in the copolymer at from 0.5 to 3 mole percent.

Suitable chain-extending, molecular-weight-increasing polyenes include, for example, alpha, omega-dienes having from 5 to 18 carbon atoms, such as 1,4-pentadiene, 1,5-hexadiene, 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, 1,14-pentadecadiene, 1,15-hexadecadiene, 1,16-heptadecadiene, 1,17-octadecadiene, or the like. Certain species of the other cyclic dienes and trienes previously discussed above can also be used in this fashion when two (or more) of the double bonds are sufficiently reactive under the particular reaction conditions to participate in the polymerization reaction.

The Catalyst System

The polymerization catalyst system used to prepare the present copolymers has been described in detail in the aforementioned commonly assigned U.S. applications. Briefly, a preferred catalyst comprises an activated cyclopentadienyl-transition metal compound wherein the transition metal component is from Group 4. The Group 4 metal compounds, i.e., titanium, zirconium and hafnium metallocene compounds, useful as first compounds in the preparation of the catalyst of this invention are cyclopentadienyl derivatives of titanium, zirconium and hafnium. In general, useful titanocenes, zirconocenes and hafnocenes may be represented by the following general formulae:

$(A-Cp)MX_1X_2$      8.

$(A-Cp)ML$      9.

$(Cp^*)(CpR)MX_1$      10.

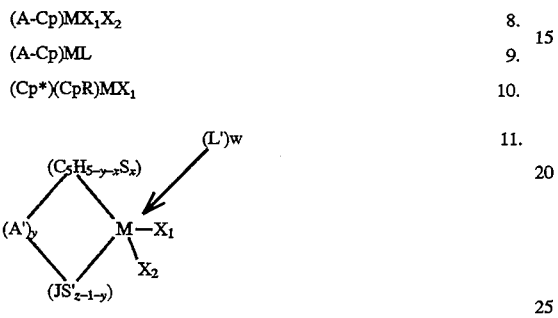      11.

wherein:

(A-Cp) is either (Cp)(Cp*) or Cp-A'-Cp*;

Cp and Cp* are the same or different cyclopentadienyl rings substituted with from zero to five substituent groups S, each substituent group S being, independently, a radical group which is a hydrocarbyl, substituted-hydrocarbyl, halocarbyl, substituted-halocarbyl, hydrocarbyl-substituted organometalloid, halocarbyl-substituted organometalloid, disubstituted boron, disubstituted nitrogen, substituted chalcogen or halogen radicals, or Cp and Cp* are cyclopentadienyl rings in which any two adjacent S groups are joined forming a $C_4$ to $C_{20}$ ring to give a saturated or unsaturated polycyclic cyclopentadienyl ligand;

R is a substituent on one of the cyclopentadienyl radicals which is also bonded to the metal atom;

A' is a bridging group, which group may serve to restrict rotation of the Cp and Cp* rings or $(C_5H_{5-y-x}S_x)$ and $(JS'_{z-1-y})$ groups;

y is 0 or 1;

$(C_5H_{5-y-x}S_x)$ is a cyclopentadienyl ring substituted with from zero to five S radicals;

x is from 1 to 5 denoting the degree of substitution;

$(JS'_{z-1-y})$ is a heteroatom ligand in which J is an element from Group 15 of the Periodic Table of Elements with a coordination number of 3 or an element from Group 16 with a coordination number of 2, S' is a radical group which is a hydrocarbyl, substituted hydrocarbyl, halocarbyl, substituted halocarbyl, hydrocarbyl-substituted organometalloid, or halocarbyl-substituted organometalloid; and z is the coordination number of the element J;

L is an olefin, diolefin or aryne ligand, or a neutral Lewis base;

L' is L or can also be a second transition metal compound of the same type such that the two metal centers M and M* are bridged by $X_1$ and $X'_1$, wherein M* has the same meaning as M and $X'_1$ has the same meaning as $X_1$ where such dimeric compounds which are precursors to the cationic portion of the catalyst are represented by the formula:

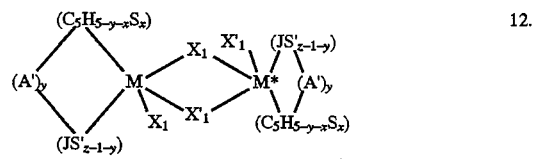      12.

w is an integer from 0 to 3; and $X_1$ and $X_2$ are, independently, hydride radicals, hydrocarbyl radicals, substituted hydrocarbyl radicals, halocarbyl radicals, substituted halocarbyl radicals, and hydrocarbyl- and halocarbyl-substituted organometalloid radicals, substituted pnitogen radicals, or substituted chalcogen radicals; or $X_1$ and $X_2$ are joined and bound to the metal atom to form a metallacycle ring containing from about 3 to about 20 carbon atoms; or $X_1$ and $X_2$ together can be an olefin, diolefin or aryne ligand; or when Lewis-acid activators are used, $X_1$ and $X_2$ can also be joined to form an anionic chelating ligand.

Table 1 depicts representative constituent moieties for the metallocene components. The list is for illustrative purposes only and should not be construed to be limiting in any way. A number of final components may be formed by permuting all possible combinations of the constituent moieties with each other.

TABLE 1

| A' | Cp, Cp*, CpR or $(C_5H_{(5-y-x)}S_x)$ | $(JS'_z)$ | $X_1$ or $X_2$ | M |
|---|---|---|---|---|
| dimethylsilyl | cyclopentadienyl | t-butylamido | hydride | zirconium |
| diethylsilyl | methylcyclopentadienyl | phenylamido | methyl | hafnium |
| di-n-propylsilyl | 1,2-dimethylcyclopentadienyl | p-n-butylphenylamido | ethyl | titanium |
| di-isopropylsilyl | 1,3-dimethylcyclopentadienyl | cyclohexylamido | phenyl | |
| di-n-butylsilyl | indenyl | perflurophenylamido | n-propyl | |
| di-t-butylsilyl | 1,2-diethylcyclopentadienyl | n-butylamido | isopropyl | |
| di-n-hexylsilyl | tetramethylcyclopentadienyl | methylamido | n-butyl | |
| methylphenylsilyl | ethylcyclopentadienyl | ethylamido | amyl | |
| ethylmethylsilyl | n-butylcyclopentadienyl | n-propylamido | isoamyl | |
| diphenylsilyl | cyclohexylmethylcyclopentdienyl | isopropylamido | hexyl | |
| di(p-t-butylphenethylsilyl) | n-octylcyclopentadienyl | benzylamido | isobutyl | |
| n-hexylmethylsilyl | beta-phenylpropylcyclopentadienyl | cyclodecylamido | heptyl | |
| cyclopentamethylenesilyl | tetrahydroindenyl | s-butylamido | octyl | |
| cyclotetramethylenesilyl | propylcyclopentadienyl | t-butylphosphido | nonyl | |
| cyclotrimethylenesilyl | t-butylcyclopentadienyl | ethylphosphido | isobutyl | |
| dimethylgermanyl | benzylcyclopentadienyl | phenylphosphido | heptyl | |

TABLE 1-continued

| | | | | |
|---|---|---|---|---|
| diethylgermanyl | diphenylmethylcyclopentadienyl | cyclohexylphosphido | octyl | |
| phenylamido | trimethylgermylcyclopentadienyl | oxo | nonyl | |
| t-butylamido | trimethylstannylcyclopentadienyl | sulfido | decyl | |
| methylamido | triethylplumbylcyclopentadienyl | | cetyl | |
| t-butyphosphido | trifluromethylcyclopentadienyl | | methylidene (both X) | |
| ethylphosphido | trimethylsilylcyclopentadienyl | | ethylidene (both X) | |
| phenylphosphido | pentamethylcyclopentadienyl (when y = 0) | | propylidene (both X) | |
| methylene | fluorenyl | | | |
| dimethylmethylene | octahydrofluorenyl | | | |
| diethylmethylene | N,N-dimethylamidocyclopentadienyl | | | |
| ethylene | dimethylphosphidocyclopentadienyl | | | |
| dimethylethylene | methoxycyclopentadienyl | | | |
| dipropylethylene | (N,N-dimethylamidomethyl)cyclopentadienyl | | | |
| propylene | | | | |

| A' | JS'$_{(z-1)}$ | X$_1$ or X$_2$ (B' - Lewis Acid) | L' | L or L' |
|---|---|---|---|---|
| dimethylpropylene | methoxide | chloro | diethylether | ethylene |
| diethylpropylene | ethoxide | fluoro | dimethylether | propylene |
| 1,1-dimethyl-3,3-dimethylpropylene | methylthio | bromo | trimethylamine | 1-butene |
| tetramethyldisiloxane | ethylthio | iodo | triphenylamine | 1,4-hexadiene |
| 1,1,4,4-tetramethyldisilylethylene | dimethylamide | methoxy | triethyamine | 1,3-butadiene |
| | diphenylamide | ethoxy | triphenylphosphine | 1,3-hexadiene |
| | methylphenylamide | propoxy | tetrhydrofuran | acetylene |
| | dicyclohexylphosphido | butoxy | thiophene | methylacetylene |
| | diphenylphosphido | phenoxy | dimethylsulfide | benzyne |
| | bis (trimethylsilyl) amido | dimethylamido | | |
| | trimethylsilyloxide | diethylamido | | |
| | | methylethylamido | | |
| | | diphenylamido | | |
| | | diphenylphosphido | | |
| | | dicyclohexylphosphido | | |
| | | dimethylphosphido | | |
| | | ethyleneglycol dianion (both X) | | |

Illustrative compounds of the formula 9 type are: bis(cyclopentadienyl) hafnium dimethyl; ethylenebis(tetrahydroindenyl) zirconium dihidryde; bis(pentamethylcyclopentadienyl) zirconium ethylidene; dimethylsilyl(1-fluorenyl)(cyclopentadienyl) titanium dichloride and the like.

Illustrative compounds of the formula 10 type are: bis(cyclopentadienyl) (1,3-butadiene) zirconium; bis(cyclopentadienyl) (2,3-dimethyl-1,3-butadiene) zirconium; bis(pentamethylcyclopentadienyl)(benzene) zirconium; bis(pentamethylcyclopentadienyl) titanium ethylene and the like.

Illustrative compounds of the formula 11 type are: (pentamethylcyclopentadienyl)(tetramethylcyclopentadienylmethylene) zirconium hydride; (pentamethylcyclopentadienyl)(tetramethylcyclopentadienylmethylene) zirconium phenyl and the like.

Illustrative compounds of the formula 12 type are: dimethylsilyl(tetramethylcyclopentadienyl) (t-butylamido) zirconium dichloride; ethylene(methylcyclopentadienyl) (phenylamido) titanium dimethyl; methylphenylsilyl (indenyl) (phenylphosphido)hafnium dihydride and (pentamethylcyclopentadienyl) (di-t-butylamido) hafnium dimethoxide.

The conditions under which complexes containing neutral Lewis base ligands such as ether or those which form dimeric compounds is determined by the steric bulk of the ligands about the metal center. For example, the t-butyl group in Me$_2$Si(Me$_4$C$_5$) (N-t-Bu) ZrCl$_2$ has greater steric requirements than the phenyl group in Me$_2$Si(Me$_4$C$_5$)(NPh) ZrCl$_2$*Et$_2$O thereby not permitting ether coordination in the former compound in its solid state. Similarly, due to the decreased steric bulk of the trimethylsilylcyclopentadienyl group in [Me$_2$Si(Me$_3$SiC$_5$H$_3$)(N-t-Bu)ZrCl$_2$]$_x$ versus that of the tetramethyl-cyclopentadienyl group in Me$_2$Si(Me$_4$C$_5$)(N-t-Bu)ZrCl$_2$, the former compound is dimeric and the latter is not.

Additional cyclopentadienyl transition metal compounds are disclosed in:

| U.S. Pat. Nos. | Issue Date |
|---|---|
| 5,055,438 | October 8, 1991 |
| 5,057,475 | October 15, 1991 |
| 5,096,867 | March 17, 1992 |
| 5,017,714 | May 21, 1991 |
| 5,153,157 | October 6, 1992 |

| U.S. Pat. App. Ser. Nos. | Filing Date |
|---|---|
| 468,382 | Feb. 28, 1990 |
| 542,236 | June 22, 1990 |
| 737,611 | July 19, 1991 |
| 885,170 | May 18, 1992 |
| 926,006 | August 5, 1992 |

| European Published Application Nos. | Publication Date |
|---|---|
| 129,368 | Dec. 27, 1984 |
| 277,003 | June 3, 1988 |
| 277,004 | June 3, 1988 | which are hereby incorporated herein by reference.

The catalysts are preferably prepared by combining at least two components. In one preferred method, the first component is a cyclopentadienyl derivative of a Group 4 metal compound containing at least one ligand which will combine with the second component or at least a portion thereof such as a cation portion thereof. The second component is an ion-exchange compound comprising a cation which will irreversibly react with at least one ligand contained in said Group 4 metal compound (first component) and a non-coordinating anion which is either a single coordination complex comprising a plurality of radicals covalently coordinated to and shielding a central formally charge-bearing metal or metalloid atom or an anion comprising a plurality of boron atoms such as polyhedral boranes, carboranes and metallacarboranes.

The cation portion of the second component may comprise Brønsted acids such as protons or protonated Lewis bases or may comprise reducible Lewis acids such as ferricinium, tropylium, triphenylcarbenium or silver cations.

In another preferred method, the second component is a Lewis-acid complex which will react with at least one ligand of the first component, thereby forming an ionic species described in formulae 1–4 with the ligand abstracted from the first component now bound to the second component. Alumoxanes and especially methylalumoxane, the product formed from the reaction of trimethylaluminum in an aliphatic or aromatic hydrocarbon with stoichiometric quantities of water, are particularly preferred Lewis-acid second components.

In general, suitable anions for the second component may be any stable and bulky anionic complex preferably having the following molecular attributes: 1) the anion should have a molecular diameter greater than 4 angstroms; 2) the anion should form stable ammonium salts; 3) the negative charge on the anion should be delocalized over the framework of the anion or be localized within the core of the anion; 4) the anion should be a relatively poor nucleophile; and 5) the anion should not be a powerful reducing or oxidizing agent. Anions meeting these criteria—such as polynuclear boranes, carboranes, metallocarboranes, polyoxoanions (including alumoxane anions), and anionic coordination complexes are well described in the chemical literature. Upon combination of the first and second components, the second component reacts with one of the ligands of the first component, thereby generating an anion pair consisting of a Group 4 metal cation and the aforementioned anion, which anion is compatible with and noncoordinating towards the Group 4 metal cation formed from the first component. The anion of the second compound must be capable of stabilizing the Group 4 metal cation's ability to function as a catalyst and must be sufficiently labile to permit displacement by an olefin, diolefin or an acetylenically unsaturated monomer during polymerization. The catalysts of this invention may be supported. U.S. Pat. Nos. 4,808,561; 4,897,455; and 5,057,475 disclose such supported catalysts and the methods to produce such and are herein incorporated by reference.

In one preferred embodiment, the catalyst system conforms to formula 1 or 2 above wherein B' is an ionic Lewis-acid activator resulting from the reaction of a Lewis-acid activator with a precursor to the cationic portion of the catalyst. More preferably, B' is a boron-containing anionic activator. In another preferred embodiment, the catalyst system conforms to formula 3. Preferably, the cycloolefin has at least 6 carbon atoms, and more preferably, is polycyclic.

The preferred activator compounds comprising Lewis-acid activators and in particular alumoxanes are represented by the following general formulae:

$(R^3Al-O)_p$      13.

$R^4(R^5-Al-O)_p-AlR^6_2$      14.

$(M')_n^+Q'_m$      15.

An alumoxane is generally a mixture of both the linear and cyclic compounds. In the general alumoxane formulae, $R^3$, $R^4$, $R^5$ and $R^6$ are, independently a $C_1$–$C_6$ alkyl radical, for example, methyl, ethyl, propyl, butyl or pentyl and p is an integer from 1 to about 50. Most preferably, $R^3$, $R^4$, $R^5$ and $R^6$ are each methyl and p is at least 4. When an alkyl aluminum halide is employed in the preparation of the alumoxane, one or more $R^{3-6}$ groups may be halide. M' is a group 5 to 15 metal or metalloid, n is an integer from 1 to 7, m is an integer from 2 to 8 and Q' is a partially or fully fluorinated hydrocarbyl.

As is now well known, alumoxanes can be prepared by various procedures. For example, a trialkyl aluminum may be reacted with water, in the form of a moist inert organic solvent; or the trialkyl aluminum may be contacted with a hydrated salt, such as hydrated copper sulfate suspended in an inert organic solvent, to yield an alumoxane. Generally, however prepared, the reaction of a trialkyl aluminum with a limited amount of water yields a mixture of both linear and cyclic species of alumoxane.

Suitable alumoxanes which may be utilized in the catalyst systems of this invention are those prepared by the hydrolysis of a trialkylaluminum, such as trimethylaluminum, triethylaluminum, tripropylaluminum, triisobutylaluminum, dimethylaluminum chloride, diisobutylaluminum chloride, diethylaluminum chloride and the like. The most preferred alumoxane for use is methylalumoxane (MAO). Methylalumoxanes having an average degree of oligomerization of from about 4 to about 25 (p=4 to 25), with a range of 13 to 25 are the most preferred.

Generally, when it is desired to produce a copolymer which incorporates high contents of cycloolefin comonomer, while maintaining high molecular weight and narrow molecular weight distribution, the species of precursor Group 4 transition metal compound preferred is one of zirconium wherein the activator compound is an alumoxane, and more preferably one of hafnium wherein the activator compound is a Lewis acid anionic coordination complex, e.g. one containing a single boron atom. Particularly preferred precursor transition metal compounds are:
dimethylsilyl bis(cyclopentadienyl) hafnium dimethyl;
dimethylsilyl bis(tetrahydroindenyl) hafnium dimethyl;
dimethylsilyl bis(indenyl) hafnium dimethyl;
bis(cyclopentadienyl) hafnium dimethyl;
dimethylsilyl bis(cyclopentadienyl) hafnium dichloride;
dimethylsilyl bis(tetrahydroindenyl) hafnium dichloride;
dimethylsilyl bis(indenyl) hafnium dichloride;
bis(cyclopentadienyl) hafnium dichloride;
dimethylsilyl bis(cyclopentadienyl) zirconium dimethyl;
dimethylsilyl bis(tetrahydroindenyl) zirconium dimethyl;
dimethylsilyl bis(indenyl) zirconium dimethyl;
bis(cyclopentadienyl) zirconium dimethyl;
dimethylsilyl bis(cyclopentadienyl) zirconium dichloride;
dimethylsilyl bis(tetrahydroindenyl) zirconium dichloride;
dimethylsilyl bis(indenyl) zirconium dichloride; and
bis(cyclopentadienyl) zirconium dichloride.

On the other hand, when it is more desirable to produce a copolymer which incorporates high contents of the longer and/or branched alpha-olefin comonomers, while still maintaining high molecular weight and narrow molecular weight distribution, the catalyst system according to formula 3 above wherein the transition metal is titanium is preferable. Mixtures of transition metal compounds can also be used where it is desired to produce intimately mixed polymers which can be inherently compatible.

The catalyst systems employed in the method of the invention comprise a complex formed upon admixture of the Group 4 transition metal component with an activating component. The catalyst system may be prepared by addition of the requisite Group 4 transition metal and alumoxane components, or a previously cationically activated Group 4 transition metal component, to an inert solvent in which alpha-olefin polymerization can be carried out by a solution, slurry or bulk phase polymerization procedure.

The catalyst system may be conveniently prepared by placing the selected Group 4 transition metal component and the selected alumoxane or ionic activating component(s), in any order of addition, in an alkane or aromatic hydrocarbon solvent, preferably one which is also suitable for service as a polymerization diluent. Where the hydrocarbon solvent utilized is also suitable for use as a polymerization diluent, the catalyst system may be prepared in situ in the polymerization reactor. Alternatively, the catalyst system may be separately prepared, in concentrated form, and added to the polymerization diluent in a reactor. Or, if desired, the components of the catalyst system may be prepared as separate solutions and added to the polymerization diluent in a reactor, in appropriate ratios, as is suitable for a continuous liquid polymerization reaction procedure. Alkane and aromatic hydrocarbons suitable as solvents for formation of the catalyst system and also as a polymerization diluent are exemplified by, but are not necessarily limited to, straight and branched chain hydrocarbons such as isobutane, butane, pentane, hexane, heptane, octane, and the like, cyclic and alicyclic hydrocarbons such as cyclohexane, cycloheptane, methylcyclohexane, methylcycloheptane, and the like, and aromatic and alkyl-substituted aromatic compounds such as benzene, toluene, xylene, and the like. Suitable solvents also include liquid olefins which may act as monomers or comonomers, including ethylene, propylene, 1-butene, 1-hexene, and the like, particularly when the catalyst components are prepared as separate solutions.

In accordance with this invention optimum results are generally obtained wherein the Group 4 transition metal compound is present in the polymerization diluent in a concentration of preferably from abut 0.00001 to about 10.0 millimoles/liter of diluent and a stoichiometric excess of the activator compound. The alumoxane component, when used, is present in an amount to provide a molar aluminum to transition metal ratio of from about 0.5:1 to about 20,000:1, whereas there is not generally such a large excess when the activator compound is a bulky non-coordinating anion such as a boron-containing compound. Sufficient solvent is normally used so as to provide adequate heat transfer away from the catalyst components during reaction and to permit good mixing.

The catalyst system ingredients, that is, the Group 4 transition metal, the alumoxane and/or ionic activators, and polymerization diluent can be added to the reaction vessel rapidly or slowly. The temperature maintained during the contact of the catalyst components can vary widely, such as, for example, from $-100°$ C. to $300°$ C. Greater or lesser temperatures can also be employed. Preferably, during formation of the catalyst system, the reaction is maintained within a temperature of from about $25°$ C. to $100°$ C., most preferably from about $25°$ C. to $60°$ C.

At all times, the individual catalyst system components, as well as the catalyst system once formed, are protected from oxygen and moisture. Therefore, the reactions are performed in an oxygen and moisture free atmosphere and, where the catalyst system is recovered separately, it is recovered in an oxygen and moisture free atmosphere. Preferably, therefore, the reactions are performed in the presence of an inert dry gas such as, for example, helium or nitrogen.

In a preferred embodiment of the process of this invention the catalyst system is utilized in the liquid phase (slurry, solution, suspension or bulk phase or combination thereof), high pressure fluid phase or gas phase (where the alpha-olefin and cycloolefin are sufficiently volatile, e.g. up to $C_8$) copolymerization of alpha-olefin and cycloolefin. These processes may be employed singularly or in series. The liquid phase process comprises the steps of contacting alpha-olefin and cycloolefin with the catalyst system in a suitable polymerization diluent and reacting said monomers in the presence of said catalyst system for a time and at a temperature sufficient to produce a copolymer of high molecular weight. Conditions most preferred for the copolymerization of alpha-olefin are those wherein alpha-olefin is submitted to the reaction zone at pressures of from about 0.019 psia to about 50,000 psia and the reaction temperature is maintained at from about $-100°$ C. to about $300°$ C. An aluminum to transition metal molar ratio is preferably from about 1:1 to 20,000 to 1. A more preferable range would be 1:1 to 2000:1. A boron-containing or other non-coordinating anion can be used at a molar ratio to the transition metal from 1:2 to 2:1, but a molar excess of the anion is preferably used. The reaction time is preferably from about 10 seconds to about 4 hours.

Without limiting in any way the scope of the invention, one means for carrying out the process of the present invention for production of the alpha-olefin/cycloolefin copolymer is as follows: in a stirred-tank reactor liquid comonomer, or comonomer in a suitable solvent, is introduced, such as 2-norbornene in toluene. The catalyst system is introduced via nozzles in either the vapor or liquid phase. Feed ethylene (or propylene) gas is introduced either into the vapor phase of the reactor, or sparged into the liquid phase as is well known in the art. The reactor contains a liquid phase composed substantially of comonomer and solvent, together with dissolved ethylene gas, and a vapor phase containing vapors of the solvent and monomers. The reactor temperature and pressure may be controlled via reflux of vaporizing solvent and/or comonomer (autorefrigeration), as well as by cooling coils, jackets etc. The polymerization rate is generally controlled by the concentration of catalyst. The ethylene and comonomer contents of the polymer product are determined by the ratio of ethylene to comonomer in the reactor, which are controlled by manipulating the relative feed rates of these components to the reactor.

In accordance with another preferred embodiment, the alpha-olefin/cycloolefin copolymer is prepared by a high pressure process. The high pressure polymerization is completed at a temperature from abut $120°$ C. to about $350°$ C., preferably from about $120°$ C. to about $250°$ C., and at a pressure of from about 100 bar to about 2000 bar, preferably from about 200 bar to about 1300 bar, in a tubular or stirred autoclave reactor. After polymerization and catalyst deactivation, the product copolymer can be recovered using conventional equipment for polymer recovery, such as, for example, a series of high and low pressure separators wherein unreacted alpha-olefin, and unreacted cycloolefin in some instances, particularly when the comonomer is relatively volatile, can be flashed off for recycle to the reactor and the polymer obtained extruded in an underwater pelletizer. An advantage of the high pressure process is that the flashing off of the cycloolefin is relatively effective, particularly at the ratio of cycloolefin:alpha-olefin used in the copolymerization to obtain the desired higher comonomer incorporation in the copolymer, in distinction from the available prior art catalyst which required a much higher, generally impractical ratio of cycloolefin:alpha-olefin to facilitate such a separation and recycle (and it was still generally not possible to obtain the high $M_w$, narrow MWD copolymers of the present invention). Pigments, antioxidants and other known additives, as are known in the art, can be added to the polymer.

The copolymerization process can be a continuous or batch reaction. Typically, the continuous process, where reactants are continuously fed to the reactor and product continuously withdrawn, is preferred in commercial production facilities for economic reasons. The continuous process also has the advantage of promoting more uniform comonomer incorporation into the polymer.

As before noted, a catalyst system wherein the Group 4 transition metal component is a hafnium species has the ability to incorporate a relatively high content of cyclic comonomer. Accordingly, the selection of the Group 4 transition metal component is another parameter which may be utilized as a control over the α-olefin content of a copolymer with a reasonable ratio of alpha-olefin to cycloolefin feed rates.

The polymers of the present invention have a surprisingly high molecular weight, preferably from about 30,000, more preferably from about 50,000, up to about 1,000,000 daltons or more, depending on the desired end-use application. As used herein, molecular weight refers to the weight average molecular weight ($M_w$), unless otherwise indicated. The unique characteristics of the copolymers are not generally observed at lower molecular weights. Polymers having a molecular weight higher than this range, while theoretically possible, are difficult to prepare as a practical matter, and are less easily processed. Most commercially useful copolymers, e.g. in film, fiber and molding applications, have $M_w$ in the range of from about 70,000 to about 500,000 daltons, most preferably above about 150,000.

The copolymers of the present invention can have a narrow molecular weight distribution (MWD), even for the copolymers of very high molecular weight. This surprising fact is reflected in a low polydispersity, i.e. a ratio of $M_w$ to number average molecular weight ($M_n$). The MWD ($M_w/M_n$) is generally less than about 4, preferably less than 2, and more preferably less than 1.8, and particularly in the range of 1.2 to 1.4.

The present copolymer generally comprises linear molecules having side chains which are cyclized with the main chain which correspond to the cycloolefin which is copolymerized by insertion of the unsaturated carbon-carbon double bond, generally without ring opening. In addition, the copolymer can also include additional branches along the main chain, in a comb-like configuration, wherein each of the side chains are of controlled configuration which reflects the configuration of the various comonomers, i.e., cyclized with the main chain, short linear, long linear, branched, vinyl aromatic, unsaturated, etc., and the stereoconfiguration of the alpha-olefin (except ethylene) which forms alkyl side chains or branches. This can be contrasted with the uncontrolled long chain branched polymers which are generally obtained by free-radically initiated, high pressure ethylene polymerization conventionally used to obtain low density polyethylene (LDPE). This derives from the use of a single-site coordination catalyst in the present methodology as opposed to a free radical catalyst. The α-olefin and cycloolefin polymerize in a predominantly head-to-tail fashion so that the polymer molecule has a generally linear main chain formed by polymerization at the carbon-carbon double bond, and a plurality of side chains of controlled size, cyclization, branching and unsaturation corresponding to the "tails" of the alpha-olefin(s) and cycloolefin.

The cycloolefin can generally comprise from about 5 to about 95 mole percent of the copolymer, but preferably comprises from about 20 to about 50 mole percent. At lower incorporation rates, the cycloolefin does not substantially affect the properties of the poly(alpha-olefin). Conversely, at higher incorporation rates, the steric bulk of the cycloolefin tends to hinder polymerization and can make post-polymerization processing difficult, requiring rather high temperatures.

The cycloolefin and alpha-olefin content of the copolymer are generally targeted to obtain the desired properties of the copolymer. The glass transition temperature ($T_g$), for instance, generally increases as the higher-$T_g$ cycloolefin content increases. The copolymer preferably has a $T_g$ of at least about 50° C. so that the characteristics of the copolymer differ substantially from the poly(alpha-olefin), but above 200° C. it becomes difficult to process the copolymer. Thus, the copolymer preferably has a $T_g$ from about 50° C. to about 200° C., more preferably from about 70° C. to about 150° C.

The present copolymer has a number of properties which make it desirable in certain applications. The copolymer generally has good toughness, optical clarity, and a relatively high distortion temperature, particularly in comparison to homopolymers of ethylene, propylene and higher alpha-olefins. Thus, the present copolymers can generally be used at higher temperatures than the alpha-olefin homopolymers, and they are generally harder and stiffer.

Antioxidant or stabilizer, when used in the copolymer compositions, can be added at from about 0.01 to about 3 percent by weight, preferably from about 0.1 to about 1.5 percent by weight, more preferably from about 0.1 to about 1 percent by weight, and typically at about 0.5 weight percent.

Particulated fillers which may be also used for thickening and price reduction include glass, silica, amorphous $SiO_2$, fumed alumina, calcium carbonate, fibers and the like. Suitable commercially available fillers are available under the trade designations CAB-O-SIL, ZEOSIL 35, AEROSIL R972, DUCRAL 10 and the like.

Suitable coupling agents include (but are not limited to) organometallic compounds such as, for example, silane-based compounds, organotitanates, organozirconates, organozircoaluminates, chrome complexes and the like. These are generally selected to promote adhesion based on the substrates and/or fillers involved in the particular application.

Suitable dyes include Fuchsine (CI 42510), Calcocid Green S (CI 44090), Solvent Yellow 34 (CI 4100B), and the like. Suitable pigments include titanium dioxide, colloidal carbon, graphite, ceramics, clays, phosphor particles and metal particles, e.g. aluminum, magnetic iron, copper, and the like.

EXAMPLES

Copolymerization Examples 1–43

Polymerization was done in a 1-liter or 2-liter autoclave reactor equipped with a paddle stirrer, an external water jacket for temperature control, a regulated supply of dry nitrogen, propylene, toluene and hexane, and a septum inlet for introduction of comonomer, transition metal compound, co-catalyst and scavenger solutions. The reactor was dried and purged thoroughly prior to use. A typical run consisted of injecting a quantity of comonomer solution (typically in toluene or a hexanes solvent), and the ethylene or propylene monomer (as a liquid or gas). The reactor was then heated to between 40° C.–60° C. and a toluene solution of the transition metal compound, previously activated by the co-catalyst, was introduced into the system by cannula or catalyst injection tube using high pressure nitrogen. The polymerization reaction was generally conducted for 10 to 120 minutes. The reaction was halted by rapidly cooling and venting the system. The resulting polymer was recovered by precipitation in methanol and/or isopropanol, filtration and drying the polymer in vacuo for about 12–48 hours at ambient temperature up to 50° C.

The following transition metal compounds, which are exemplary of the preferred catalyst systems for the preparation of copolymers according to the present invention, were used in the polymerizations of these examples:

| CATALYST DESIGNATION | TRANSITION METAL COMPOUND |
|---|---|
| A | $Me_2Si(H_4Ind)_2HfMe_2$ - dimethylsilanylene bis(tetrahydroindenyl) hafnium dimethyl |
| B | $Cp_2HfMe_2$ - bis(cyclopentadienyl) hafnium dimethyl |
| C | $Me_2Si(C_5Me_4)(NC_{12}H_{23})TiCl_2$ - dimethylsilanylene(tetramethylcyclopentadienyl) (amidocyclododecyl) titanium dichloride |
| D | $CP_2ZrMe_2$ - bis(cyclopentadienyl) zirconium dimethyl |
| E | $Me_2Si(H_4Ind)_2ZrCl_2$ - dimethylsilanylene bis(tetrahydroindenyl) zirconium dichloride |
| F | $Me_2Si(C_5Me_4)(NC_{12}H_{23})TiMe_2$ - dimethylsilanylene(tetramethylcyclopentadienyl) (amidocyclododecyl) titanium dimethyl |

The co-catalysts were methylalumoxane (MAO), or dimethylanilinium tetra(perfluorophenyl) borate (DMAH B(pfp$_4$)). Scavengers, when used, were diethyl aluminum chloride (DEAC), trimethyl aluminum (TMA) or triethyl aluminum (TEAL).

Table 2 gives the process conditions and results. Process run data include the type and active amount of transition metal catalyst (TMC), co-catalyst, and scavenger (if any), the kind of solvent (if any), the type and amount of monomer and comonomer, the polymerization temperature and reaction time. Results are presented in terms of polymer yield and comonomer content as determined by carbon nuclear magnetic resonance (CNMR) and/or proton NMR (HNMR). Also, polymer properties selectively include weight average molecular weight ($M_w$) as determined by gel permeation chromatography, polydispersity index or MWD ($M_w/M_n$), $T_g$ as determined by dynamic mechanical thermal analysis method (DMTA) or differential scanning calorimetry (DSC), and density.

For an example of a typical propylene/norbornene copolymerization (see Example 1 in Table 2), 20.6 g of norbornene dissolved in 400 mL hexanes were added to the reactor described above. Propylene (200 mL), was added using $N_2$ pressure and the reactor was heated (40° C.) and stirred. The metallocene (18.4 mg) and 10.0 mg of the non-coordinating anion (DMAH B(pfp$_4$)) were mixed in toluene (2–3 mL) until the $CH_4$ stopped bubbling off. This two-phase oil/toluene mixture was sealed in a catalyst injection tube, the tube was connected to the reactor and then pressurized with high pressure $N_2$. The activated catalyst was introduced to the reactor by opening the tube to the reactor. The polymerization reaction was conducted for 48 minutes, yielding 2.70 g of copolymer containing 18.6 mole percent norbornene, and having $M_w$ of 50,810 and PDI of 1.76.

For an example of a typical ethylene/norbornene copolymerization (see Example 23 in Table 2), 15.5 g norbornene dissolved in 400 ml hexanes were added to the reactor described above. The reactor was heated to 40° C. The catalyst solution containing 3.5 mg metallocene and 7.0 mg of MAO in toluene was mixed before adding to the reactor by cannula. Ethylene was immediately added to bring the reactor to 50 psig. The polymerization was conducted for 14 minutes, after which time the reaction was halted by rapidly cooling and venting the system. The resulting polymer (3.44 g) was recovered by precipitating the viscous solution into MeOH, filtering through a medium or course frit, and drying in vacuum as stated above. The polymer characteristics include $M_w$ of 60,906, MWD of 1.48, and Tg of 55° C.

TABLE 2

| Ex. No. | Cat. Des. | Active Cat. Conc. (mg) | Co-cat. Type | Reactor Solvent | Reactor Temp. (°C) | Monomer Type | Mono. Conc. (psi or ml) | Comonomer Type | Comon. Conc. (g) | Run Time (min) | Yield (g) | Mw [Int. Visc. (dl/g)] | PDI (M_w/M_n) | Com. Content CNMR (mol %) [HNMR] | Tg DMTA (°C.) [DSC] | Density (g/ml) |
|---|---|---|---|---|---|---|---|---|---|---|---|---|---|---|---|---|
| 1 | A | 40.0 | DMAH B(pfp)4 | Hexane | 40.0 | Propylene | 150.0 | Norbornene | 9.9 | 30.0 | 100.0 | N/A | N/A | N/A | N/A | N/A |
| 2 | A | 18.4 | DMAH B(pfp)4 | Hexane | 40.0 | Propylene | 200.0 | Norbornene | 20.6 | 48.0 | 2.70 | 50810 | 1.76 | 18.6 | 32.0 | N/A |
| 3 | A | N/A | DMAH B(pfp)4 | none | 40.0 | Propylene | 164.0 | Norbornene | 15.0 | 22.0 | 5.67 | 54985 | 1.72 | 15.4 | 46.0 | N/A |
| 4 | B | 54.0 | DMAH B(pfp)4 | none | 40.0 | Propylene | 136.0 | Norbornene | 10.0 | 30.0 | 16.00 | 33269 | 1.97 | N/A | 28.0 | N/A |
| 5 | B | 51.5 | DMAH B(pfp)4 | none | 45.5 | Propylene | 300.0 | Norbornene | 19.7 | 30.0 | 3.75 | 13230 | 1.89 | 29.6 | N/A | 0.965 |
| 6 | B | 50.0 | DMAH B(pfp)4 | none | 45.5 | Propylene | 300.0 | Norbornene | 10.3 | 34.0 | 3.80 | 37647 | 1.80 | N/A | N/A | N/A |
| 7 | C | 12.3 | MAO | Hexane | 40.0 | Propylene | 102.0 | Norbornene | 9.7 | 24.0 | 7.60 | 181386 | 1.64 | 11.4 | 22.0 | 0.905 |
| 8 | C | 13.3 | MAO | none | 40.0 | Propylene | 300.0 | Norbornene | 10.0 | 28.0 | 17.20 | 313301 | 1.77 | N/A | N/A | N/A |
| 9 | A | 21.0 | DMAH B(pfp)4 | none | 40.0 | Propylene | 150.0 | Norbornene | 14.7 | 62.0 | 2.00 | 57186 | 1.72 | 16.2 | 42.0 | N/A |
| 10 | A | 22.3 | DMAH B(pfp)4 | none | 50.0 | Propylene | 150.0 | Norbornene | 14.8 | 68.0 | 2.40 | 49850 | 1.55 | 18.1 | [20] | N/A |
| 11 | A | 21.4 | DMAH B(pfp)4 | none | 50.0 | Propylene | 150.0 | Norbornene | 29.5 | 60.0 | 1.00 | 34199 | 1.68 | 33.3 | [45] | N/A |
| 12 | A | 30.9 | DMAH B(pfp)4 | none | 50.0 | Propylene | 160.0 | Norbornene | 29.5 | 114.0 | 1.55 | 40357 | 1.57 | N/A | [35] | N/A |
| 13 | A | 70.6 | DMAH B(pfp)4 | none | 50.0 | Propylene | 160.0 | Norbornene | 29.5 | 123.0 | 31.8 | 45600 [0.3840] | 1.65 | 23.1 | [29] | N/A |
| 14 | A | 22.0 | DMAH B(pfp)4 | none | 35.0 | Propylene | 150.0 | Norbornene | 69.0 | 30.0 | 2.10 | 40030 | 1.70 | 27.7 | N/A | N/A |
| 15 | A | 24.6 | DMAH B(pfp)4 | none | 40.0 | Propylene | 150.0 | Norbornene | 69.0 | 55.0 | 1.79 | 40030 [0.3500] | 1.50 | 29.8 | [60] | N/A |
| 16 | A | 9.7 | DMAH B(pfp)4 | Toluene | 40.0 | Propylene | 400.0 | Norbornene | 20.4 | 67.0 | 0.01 | N/A | N/A | N/A | N/A | N/A |
| 17 | A | 15.9 | DMAH B(pfp)4 | Toluene | 40.0 | Propylene | 400.0 | Norbornene | 10.2 | 92.0 | 6.52 | 215643 | 1.91 | N/A | N/A | N/A |
| 18 | A | 45.9 | DMAH B(pfp)4 | none | 40.0 | Propylene | 400.0 | Norbornene | 10.2 | 62.0 | 5.40 | [2.123] | N/A | 1.50 | [10] | N/A |
| 19 | A** | 26.5 | DMAH B(pfp)4 | Toluene | 60.0 | Propylene | 400.0 | Norbornene | 40.8 | 30.0 | 43.00 | 88927 [0.8890] | 1.65 | 4.7 | N/A | N/A |
| 20 | A** | 47.9 | DMAH B(pfp)4 | Toluene | 40.0 | Propylene | 400.0 | Norbornene | 65.3 | 29.0 | 33.66 | 87225 | 1.49 | 6.7 | [7.0] | N/A |
| 21 | A** | 23.3 | DMAH B(pfp)4 | Toluene | 40.0 | Propylene | 400.0 | Norbornene | 61.2 | 22.0 | 15.35 | 92528 | 1.54 | N/A | [8.4] | N/A |
| 22 | F | 17.2 | DMAH B(pfp)4 | Toluene | 40.0 | Ethylene | 400.0 | Norbornene | 44.9 | 1.0 | 15.80 | 323574 | 1.86 | N/A | N/A | N/A |
| 23 | E | 3.5 | MAO | Hexane | 40.0 | Ethylene | 50.0 | Norbornene | 15.5 | 14.0 | 3.44 | 60905 | 1.48 | 27.5 | 55.0 | N/A |
| 24 | E | 4.5 | MAO | Hexane | 40.0 | Ethylene | 50.0 | Norbornene | 31.0 | 17.0 | 4.00 | N/A | N/A | 38.9 | 101 | 1.023 |
| 25 | E | 2.5 | MAO | Hexane | 40.0 | Ethylene | 50.0 | Norbornene | 31.0 | 20.0 | 4.85 | N/A | N/A | 38.0 | 72.0 | N/A |

TABLE 2-continued

| Ex. No. | Cat. Des. | Active Cat. Conc. (mg) | Co-cat. Type | Reactor Solvent | Reactor Temp. (°C.) | Monomer Type | Mono. Conc. (psi or ml) | Comonomer Type | Comon. Conc. (g) | Run Time (min) | Yield (g) | Mw [Int. Visc. (dl/g)] | PDI (Mw/Mn) | Com. Content CNMR (mol %) [HNMR] | Tg DMTA (°C.) [DSC] | Density (g/ml) |
|---|---|---|---|---|---|---|---|---|---|---|---|---|---|---|---|---|
| 26 | E | 3.5 | MAO | Toluene | 80.0 | Ethylene | 50.0 | Norbornene | 31.0 | 36.0 | 45.70 | 28735 | 1.85 | 14.97 [19.4] | 32.0 | 0.970 |
| 27 | B | 18.9 | DMAH B(pfp)4 | Hexane | 50.0 | Ethylene | 50.0 | Norbornene | 31.0 | 31.0 | 3.30 | 17707 | 2.11 | 22.52 | 102.0 | N/A |
| 28 | B | 21.9 | DMAH B(pfp)4 | Hexane | 50.0 | Ethylene | 50.0 | Norbornene | 31.0 | 42.0 | 2.60 | 19443 | 1.73 | 24.70 | 61.0 | N/A |
| 29 | B | 22.0 | DMAH B(pfp)4 | Hexane | 40.0 | Ethylene | 50.0 | Norbornene | 14.7 | 38.0 | 14.70 | 420986 | 11.59 | 22.10 | 49.0 | N/A |
| 30 | B | 31.2 | DMAH B(pfp)4 | Hexane | 40.0 | Ethylene | 100.0 | Norbornene | 5.1 | 32.0 | 6.50 | 936617 | 2.45 | N/A | N/A | N/A |
| 31 | B | 58.3 | DMAH B(pfp)4 | Toluene | 40.0 | Ethylene | 50.0 | Norbornene | 5.1 | 25.0 | 16.38 | N/A | N/A | N/A | N/A | N/A |
| 32 | B | 38.0 | DMAH B(pfp)4 | Toluene | 40.0 | Ethylene | 50.0 | Norbornene | 5.1 | 25.0 | 19.23 | 209832 | 5.61 | 9.98 | N/A | N/A |
| 33 | B | 45.0 | DMAH B(pfp)4 | Toluene | 40.0 | Ethylene | 50.0 | Norbornene | 5.1 | 32.0 | 18.50 | N/A | N/A | 13.80 | N/A | 0.870 |
| 34 | A | 48.9 | DMAH B(pfp)4 | Toluene | 40.0 | Ethylene | 10.8 | Norbornene | 5.1 | 35.0 | 2.88 | 147171 | 1.50 | N/A | [34] | N/A |
| 35 | A | 30.0 | DMAH B(pfp)4 | Toluene | 50.0 | Ethylene | 50.0 | 3-Methyl-pentene-1 | 41.8 | 8.0 | 8.50 | 116542 | 36.50 | 51.00 | N/A | N/A |
| 36 | A | 16.4 | DMAH B(pfp)4 | Toluene | 30.0 | Ethylene | 50.0 | 3-Methyl-pentene-1 | 45.0 | 24.0 | 15.59 | 368330 | 2.83 | 18.80 | N/A | N/A |
| 37 | A* | 135.8 | DMAH B(pfp)4 | Toluene | 40.0 | Propylene | 50.0 | Norbornene | 20.7 | 54.0 | 10.10 | 39122 [0.3370] | 1.58 | [30.76] | [37.9] | N/A |
| 38 | A | 118.9 | DMAH B(pfp)4 | Toluene | 40.0 | Propylene | 50.0 | Norbornene | 13.8 | 83.0 | 17.90 | 46415 | 1.62 | [19.84] | [19.7] | N/A |
| 39 | A | 82.1 | DMAH B(pfp)4 | Toluene | 40.0 | Ethylene Propylene | 8/45 | Norbornene | 9.9 | 67.0 | 15.70 | 90511 | 1.43 | [11.10] | N/A | N/A |
| 40] | A | 77.2 | DMAH B(pfp)4 | Toluene | 40.0 | Propylene | 100.0 | Norbornene | 10.1 | 80.0 | 30.00 | 86200 | 1.61 | N/A | N/A | N/A |
| 41 | B | 50.0 | DMAH B(pfp)4 | Toluene | 40.0 | Propylene | 50.0 | Norbornene | 10.0 | 76.0 | 0.87 | N/A | N/A | N/A | [39.0] | N/A |
| 42 | A | 74.8 | DMAH B(pfp)4 | Toluene | 40.0 | Ethylene | 5.0 | Deltacyclene | 5.0 | 9.0 | 10.30 | 120159 | 1.97 | [18] | N/A | N/A |
| 43 | A*** | 52.9 | DMAH B(pfp)4 | Toluene | 48.0 | Ethylene | 11.2 | Norbornene | 5.3 | 18.0 | 5.40 | 97478 | 1.31 | N/A | 34.6 | N/A |

N/A Data not available.
*50 μl TEA used as scavenger.
**43 μl DEAC used as scavenger.
***100 μl 2M TMA used as scavenger.

Example 44

In this Example, ethylene and cyclopentene were copolymerized by adding through a double-ended needle to one-liter stainless-steel autoclave, previously purged with nitrogen and containing 400 ml of dry, deoxygenated hexane and 100 ml of cyclopentene, a toluene solution (50 ml) containing bis(cyclopentadienyl) hafnium dimethyl (36 mg) and N,N-dimethylanilinium tetrakis(pentafluoro-phenyl) boron (11 mg). The autoclave was heated to 50° C. and pressurized with 70 psi of ethylene. After 10 minutes, the reactor was cooled and the polymer isolated. Yield: 18.4 g of ethylene-cyclopentene copolymer.

Example 45

In this Example, ethylene, propylene, and cyclopentene were copolymerized by adding through a double-ended needle to a one-liter stainless-steel autoclave, previously purged with nitrogen and containing 400 ml of dry, deoxygenated hexane and 50 ml of cyclopentene, a toluene solution (50 ml) containing bis(cyclopentadienyl)hafnium dimethyl (36 mg) and N,N-dimethylanilinium tetrakis (pentafluorophenyl)boron (11 mg). Propylene (50 ml) was added. The autoclave was heated to 45° C. and pressurized with 60 psi of ethylene. After 10 minutes, the reactor was cooled and the polymer isolated. Yield: 42.9 g of ethylene-propylene-cyclopentene terpolymer.

Example 46

In this Example, propylene and cyclopentene were copolymerized by adding through a double-ended needle to a one-liter stainless-steel autoclave, previously purged with nitrogen and containing cyclopentene (100 ml), a toluene solution (50 ml) containing bis(cyclopentadienyl) hafnium dimethyl (36 mg) and N,N-dimethylanilinium tetrakis (pentafluorophenyl)boron (11 mg). Propylene (100 ml) was added. The autoclave was heated to 50° C. After 1 hour, the reactor was cooled and the polymer isolated. Yield: 23.7 g of propylene-cyclopentene copolymer.

Example 47

In this Example, ethylene and norbornene were copolymerized by adding through a double-ended needle to a one-liter stainless-steel autoclave, previously purged with nitrogen and containing 500 ml of dry, deoxygenated hexane and 50 g of cyclopentene, a toluene solution (25 ml) containing bis(cyclopentadienyl)hafnium dimethyl (18 mg) and N,N-dimethylanilinium tetrakis(pentafluorophenyl) boron (6 mg). The autoclave was heated to 50° C. and pressurized with 70 psi of ethylene. After 64 minutes, the reactor was cooled and the polymer isolated. Yield: 55.9 g of ethylene-norbornene copolymer.

Many modifications and variations besides the embodiments specifically mentioned may be made in the compositions and methods described herein without substantially departing from the concept of the present invention. Accordingly, it should be clearly understood that the form of the invention described herein is exemplary only, and is not intended as a limitation of the scope thereof.

What is claimed is:

1. A method for preparing a substantially random cyclic olefin copolymer having from about 5 to about 95 mole percent cycloolefin, comprising contacting one or more cycloolefin monomers with one or more other olefins in the presence of an activated, bridging group containing monocyclopentadienyl Group 4 Transition metal compound containing a heteroatom ligand having a Group 15 element with a coordination number of 3 or a Group 16 element with a coordination number of 2, and recovering said copolymer.

2. A method for preparing a substantially random cyclic olefin copolymer having from about 5 to about 95 mole percent cycloolefin, comprising:

a) charging a reactor with alpha-olefin and cycloolefin at reaction conditions in the presence of a catalyst system including an ionic catalyst according to the formula:

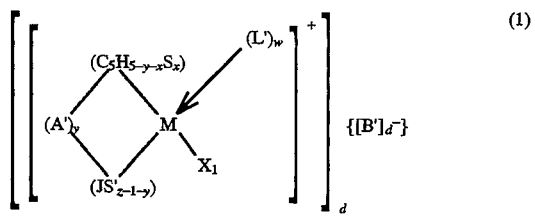

wherein

A' is a bridging group, which group may serve to restrict rotation of the $(C_5H_{5-y-x}S_x)$ and $(JS'_{z-1-y})$ groups;

$(C_5H_{5-y-x}S_x)$ is a cyclopentadienyl ring substituted with from zero to four S radicals;

x is from 0 to 4 denoting the degree of substitution;

S is a substituent group each S, independently being a radical group which is a hydrocarbyl, substituted-hydrocarbyl, halocarbyl, substituted-halocarbyl, hydrocarbyl-substituted organometalloid, halocarbyl-substituted organometalloid, disubstituted boron, disubstituted nitrogen, substituted chalcogen or halogen radicals, including adjacent S groups joined to form a $C_4$ to $C_{20}$ ring to give a saturated or unsaturated polycyclic cyclopentadienyl ligand;

M is titanium, zirconium or hafnium;

$X_1$ is a hydride radical, hydrocarbyl radical, substituted-hydrocarbyl radical, hydrocarbyl-substituted organometalloid radical or halocarbyl-substituted organometalloid radical which radical may optionally be covalently bonded to both or either M and L or all or any M, $S_x$ or S';

$(JS'_{z-1-y})$ is a heteroatom ligand in which J is an element from Group 15 of the Periodic Table of Elements with a coordination number of 3 or an element from Group 16 with a coordination number of 2;

S' is a radical group which is a hydrocarbyl, substituted hydrocarbyl, halocarbyl, substituted halocarbyl, hydrocarbyl-substituted organometalloid, or halocarbyl-substituted organometalloid;

z is the coordination number of the element J;

y is 1;

L' is an olefin, diolefin or aryne ligand, or a neutral Lewis base, with w being an integer from 0 to 3 or can also be a second transition metal compound of the same type such that the two metal centers M and M* are bridged by $X_1$ and $X'_1$, wherein M* has the same meaning as M and $X'_1$ has the same meaning as $X_1$ where such dimeric compounds which are precursors to the cationic portion of the catalyst are represented by the formula:

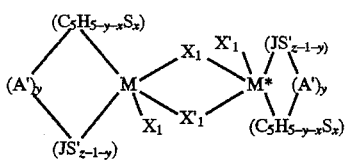
(2)

B' is a chemically stable, non-nucleophilic anionic complex having a molecular diameter about or greater than 4 angstroms d is an integer representing the charge of B'; and b) polymerizing the alpha-olefin and cycloolefin.

3. The method of claim 1, wherein the reactor charge also includes a minor amount of a scavenger.

4. The method of claim 1, wherein the cycloolefin has at least 6 carbon atoms.

5. The method of claim 1, wherein the cycloolefin is polycyclic.

6. The method of claim 1, wherein the alpha-olefin comprises ethylene, propylene or a combination thereof.

7. The method of claim 6, wherein the alpha-olefin further includes a longer alpha-olefin having up to 1000 carbon atoms.

8. The method of claim 6, wherein the alpha-olefin further includes a branched alpha-olefin.

9. The method of claim 1 wherein the transition metal is titanium.

10. The method of claim 1, wherein J is nitrogen.

11. The method of claim 10, wherein $S'_{z-1-y}$ is a cyclododecyl hydrocarbyl group.

12. The process according to claim 1 wherein said polymerizing is in the presence of a minor amount of scavenger.

13. The method of claim 1 wherein the cycloolefin includes at least one selected from the group consisting of cyclobutene, cyclopentene, deltacyclene, 2-norbornene, 3-methyl-2-norbornene, 5-methyl-2-norbornene, tetracyclododecene, methyltetracyclododecene, and dimethyltetracyclododecene.

14. The method of claim 6 wherein the cycloolefin is one or more of cyclopentene, 2-norbornene or 5-ethylidenenorbornene-2.

15. The method of claim 1 wherein the cycloolefin includes at least one selected from the group consisting of cyclobutene, cyclopentene, deltacyclene, 2-norbornene, 3-methyl-2-norbornene, 5-methyl-2-norbornene, tetracyclododecene, methyltetracyclododecene, and dimethyltetracyclododecene.

16. The method of claim 1 wherein the alpha-olefin comprises ethylene, propylene or a combination thereof and the cycloolefin is one or more of cyclopentene, 2-norbornene or 5-ethylidenenorbornene-2.

* * * * *